(12) United States Patent
Koike et al.

(10) Patent No.: US 6,782,743 B2
(45) Date of Patent: Aug. 31, 2004

(54) FLOW METERING METHOD AND FLOWMETER

(75) Inventors: Atsushi Koike, Ageo (JP); Kiyoshi Yamagishi, Ageo (JP); Shinya Furuki, Nirasaki (JP); Kenichi Hiraizumi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/343,341

(22) PCT Filed: Jul. 30, 2001

(86) PCT No.: PCT/JP01/06546
§ 371 (c)(1),
(2), (4) Date: Jan. 29, 2003

(87) PCT Pub. No.: WO02/10693
PCT Pub. Date: Feb. 7, 2002

(65) Prior Publication Data
US 2003/0146758 A1 Aug. 7, 2003

(30) Foreign Application Priority Data
Jul. 31, 2000 (JP) ........................................ 2000-231520
Apr. 10, 2001 (JP) ........................................ 2001-111333

(51) Int. Cl.⁷ ................................................. G01F 5/00
(52) U.S. Cl. ................................................... 73/202.5
(58) Field of Search .......................... 73/204.5, 204.17, 73/204.19, 204.27, 204.23, 202.5

(56) References Cited
U.S. PATENT DOCUMENTS 6,023,696 A * 2/2000 Osborn et al. ................. 707/3
6,308,553 B1 * 10/2001 Bonne et al. ................. 73/1.35
6,446,504 B1 * 9/2002 Maginnis, Jr. ........... 73/204.27

FOREIGN PATENT DOCUMENTS

| JP | 6-64119 | 9/1994 |
| JP | 08159838 A | 6/1996 |
| JP | 11118566 A | 4/1999 |
| JP | 11153466 A | 6/1999 |

* cited by examiner

Primary Examiner—Edward Lefkowitz
Assistant Examiner—Jewel V. Thompson
(74) Attorney, Agent, or Firm—Frommer Lawrence & Haug LLP; Ronald R. Santucci

(57) ABSTRACT

A flow metering method and a flowmeter capable of providing an electric output corresponding to the metered flow rate of metered fluid by an electric circuit including a thermal type flow sensor disposed in a metering flow path and an electric output corresponding to the reference flow rate of the metered fluid by an electric circuit including a reference thermal type flow sensor disposed in a reference flow path allowing the metered flow to flow freely; the flow metering method, comprising the steps of providing a calibration curve including a reference flow calibration curve and a measurement flow calibration curve at a plurality of temperatures for reference fluid beforehand, providing the deviated amount of the temperature of the reference flow calibration curve from the reference temperature corresponding to the electric output based on the electric output corresponding to the reference flow calibration curve based on the deviated amount, and converting the temperature corrected amount to the flow value of the metered fluid based on the electric output corresponding to the metered flow rate of the metered fluid by using the measured flow rate calibration curve of the reference temperature and by allowing for the temperature corrected amount.

20 Claims, 19 Drawing Sheets

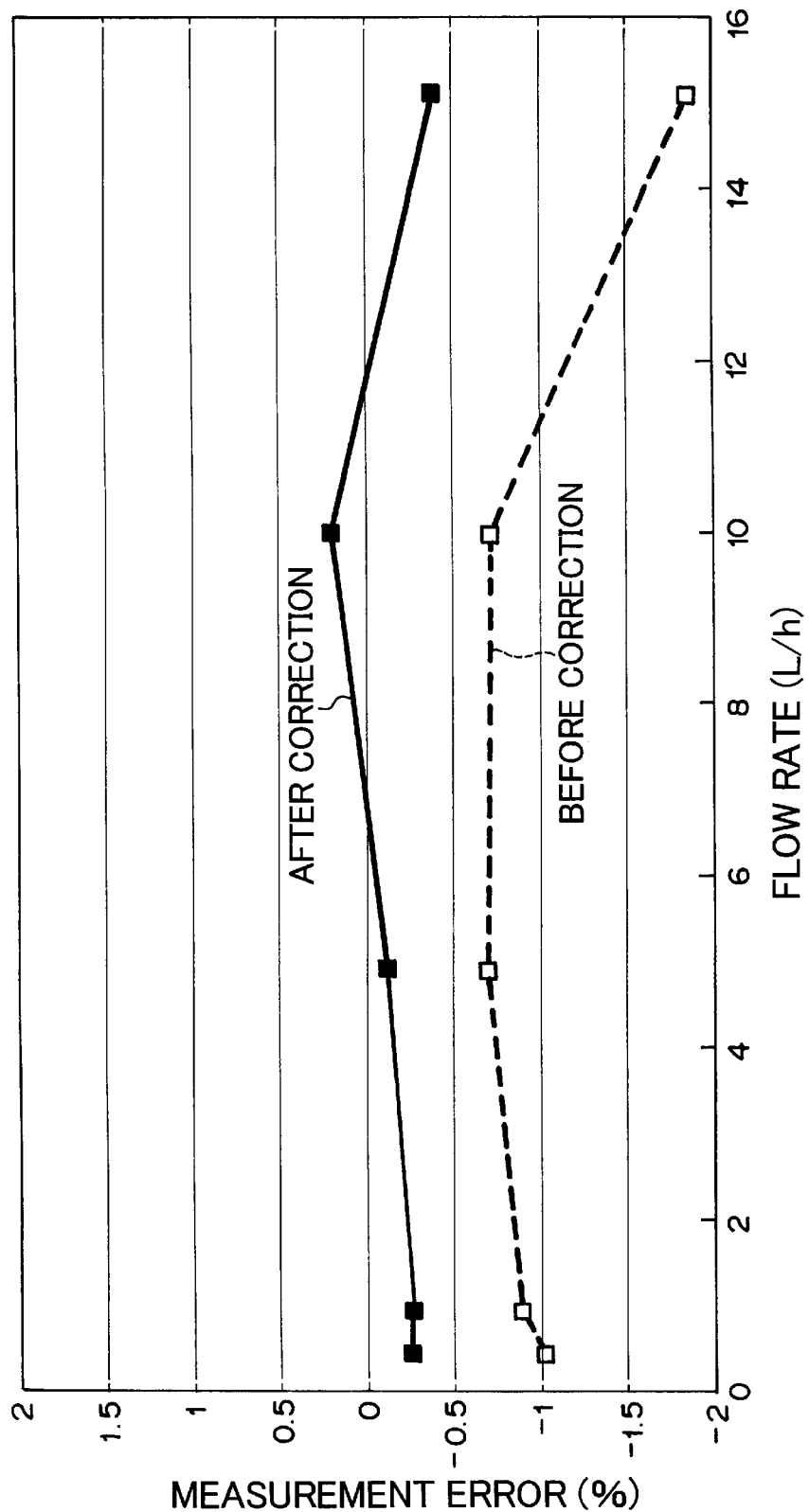

FLOW METERING METHOD AND FLOWMETER

This application is a 371 of PCT/JP01/06546 filed on Jul. 30, 2001, published on Feb. 7, 2002 under publication number WO 02/10693 A1 and claims priority benefits of Japanese Patent Application No. 2000-23 1520 filed Jul. 31, 2000 and Japanese Patent Application No. 2001-111333 filed Apr. 10, 2001.

TECHNICAL FIELD

The present invention relates to a fluid flow metering technique, and particularly to a flow metering method and a flowmeter for metering an instantaneous flow rate or integrated flow rate of fluid flowing in a pipe.

BACKGROUND TECHNIQUE

A flowmeter is used to meter the flow rate of fluid such as kerosene, water, gas or the like consumed at home or business enterprise. A thermal type (particularly, indirectly heated type) flow sensor which is easily reduced in cost has been used as a flowmeter.

There is known such an indirectly heated type flow sensor that a sensor chip comprising a thin film heating element and a thin film temperature-sensing element which are laminated through an insulating layer on a substrate by using a thin film technique is disposed so that heat transfer is allowed between the sensor chip and fluid in a pipe (containing a fluid flow passage provided in a flowmeter so as to inter-communicate with an outer pipe). The temperature-sensing element is heated by making current flow into the heating element to vary the electrical characteristic, for example, the value of electrical resistance of the temperature-sensing element. The variation of the electrical resistance value (based on increase in temperature of the temperature-sensing element) is varied in accordance with the flow amount (flow rate) of fluid flowing in the pipe. This is because a part of the heating value of the heating element is transferred to the fluid, the heating value diffused into and absorbed by the fluid is varied in accordance with the flow amount (flow rate) to thereby vary the heating value to be supplied to the temperature-sensing element. Therefore, the electrical resistance value of the temperature-sensing element is varied. The variation of the electrical resistance value of the temperature-sensing element is made different in accordance with the temperature of the fluid. Therefore, there has been utilized such a manner that a temperature sensing element for temperature compensation is installed in an electrical circuit for measuring the variation of the electrical resistance value of the temperature-sensing element so that the variation of the metered flow-rate value due to the temperature of the fluid is suppressed to the minimum level.

Such an indirectly heated type flow sensor using a thin film element as described above is disclosed in JP-A-11-118566, for example. This flow sensor uses an electrical circuit containing a bridge circuit for achieving an electrical output corresponding to the flow rate of fluid.

In the flowmeter as described above, a fin plate for the heat exchange between the sensor chip and the fluid is projected into the fluid flow passage, and an electrical circuit portion containing a circuit board for calculating the flow rate, a display portion, a communication circuit connecting portion and other parts are disposed at the peripheral portion of the flow sensor, and all the function portions of the flowmeter containing the above parts are accommodated in the housing.

In a flowmeter using an indirectly heated type flow sensor, a part of the heating value occurring in the heating element (heater) is transmitted to the fluid, and on the basis of the fact that heat absorption is performed in accordance with the flow rate of the fluid, the output value of the electrical circuit which corresponds to the heat absorption amount is converted to the flow rate value by using a calibration curve. The calibration curve is achieved on the basis of an experiment or the like which was performed on fluid to be subjected to the flow-rate metering. Accordingly, when the fluid to be subjected to the flow rate metering has the same thermal property as the fluid used when the calibration curve was created, substantially no error occurs in the flow-rate metering when the conversion using the calibration curve is carried out.

However, when the target fluid which is to be subjected to the flow-rate metering is formed of a mixture containing plural kinds of molecules which are different in molecular weight such as kerosene, the fluid to be actually subjected to the flow-rate metering does not necessarily have the same thermal property as the fluid used when the calibration curve was created. That is, standards such as JIS or the like are provided to kerosene, however, such standards have some degree of permissible range for physical property values. As a matter of fact, as a result of investigation of kerosene which is actually sold in the market, it has been found that there is some dispersion in the thermal property thereof. This dispersion is caused by variation of compositions of kerosene due to the difference in oil factory in which kerosene is achieved from raw petroleum, etc.

As described above, some kinds of kerosene are different in thermal property because they are fluid belonging to the same category of kerosene, but have different compositions. Therefore, when fluid to be subjected to the flow-rate metering has a thermal property different from that of fluid used when the calibration curve is created, some error may occur in the metered flow-rate value when the conversion using the calibration curve is carried out in the flow-rate metering. Specifically, when a consumption amount of kerosene is metered by a flowmeter equipped to a kerosene consumer such as each home or the like, kerosene to be supplied does not necessarily have a fixed composition and a fixed thermal property. In some cases, an amount different from the actually-consumed kerosene amount is achieved as a metered flow-rate value.

Not only kerosene, but also gasoline, naphtha, diesel oil, liquefied petroleum gas (LPG), solution having concentration variation, slurry, sol or the like is cited as an example of fluid which is targeted for the flow-rate metering and has variation in composition causing variation in thermal property as described above.

Therefore, the present invention has an object to perform flow-rate metering having little metering error even when the thermal property of fluid is varied due to variation of the composition of fluid or the like. Particularly, the present invention has an object to provide a method and a flowmeter for the flow-rate metering as described above.

DISCLOSURE OF THE INVENTION

According to the present invention, in order to attain the above object, there is provided a method of metering a flow rate of fluid by making the fluid under metering flow into a metering flow path, achieving the electrical output corresponding to a metered flow rate of the fluid under metering in the metering flow path by an electrical circuit constructed so as to contain a thermal type flow sensor disposed in the metering flow path and converting the electrical output corresponding to the metered flow rate to a flow-rate value by using pre-created calibration curves, wherein:

the fluid under metering is filled in a reference flow path so as to freely flow, and the electrical output corresponding to a reference flow rate of the fluid under metering in the reference flow path is achieved by an electrical circuit constructed so as to contain a thermal type reference flow sensor disposed in the reference flow path;

the calibration curves contain reference flow-rate calibration curves and metered flow rate calibration curves that are achieved with reference to plural temperatures for reference fluid; and on the basis of the electrical output corresponding to the reference flow rate achieved for the fluid under metering, a deviation amount of the temperature on the reference flow-rate calibration curve corresponding to the electrical output corresponding to the reference flow rate from a reference temperature is determined, a temperature correction amount to the metered flow rate calibration curve of the reference temperature is achieved on the basis of the deviation amount, and the conversion to the flow rate value of the fluid under metering is performed on the basis of the electrical output corresponding to the metered flow rate of the fluid under metering by using the metered flow rate calibration curve for the reference temperature and taking the temperature correction amount into consideration.

In an aspect of the flow rate metering method according to the present invention, with respect to fluid different from the reference fluid, a second temperature on a reference flow rate calibration curve which corresponds to the electrical output corresponding to a reference flow rate achieved at a first temperature is determined, a third temperature on a metered flow rate calibration curve at a certain flow rate corresponding to the electrical output corresponding to a metered flow rate achieved at the certain flow rate at the first temperature is determined, the ratio of the difference between the first temperature and the third temperature to the difference between the first temperature and the second temperature is achieved, and then the deviation amount is multiplied by the ratio to achieve the temperature correction amount.

In an aspect of the flow rate metering method according to the present invention, the calibration curves contain a specific gravity calibration curve indicating the relationship between the electrical output corresponding to the reference flow rate and the specific gravity, and conversion from the flow rate value of the fluid under metering to a volumetric flow rate value of the fluid under metering is performed by using the specific gravity calibration curve.

According to the present invention, in order to attain the above object, there is also provided a flowmeter for metering a flow rate of fluid passing through a housing by feeding the fluid into the housing, stocking the fluid in the housing and feeding out the fluid to the outside of the housing, comprising:

a metering flow path disposed in the housing for passing the fluid in connection with the feed-in or feed-out of the fluid into/from the housing; a reference flow path disposed in the housing, the fluid stocked being filled in the reference flow path so as to freely flow; a thermal type metering flow sensor disposed in the metering flow path; and a thermal type reference flow sensor disposed in the reference flow path, wherein the electrical output corresponding to a metered flow rate achieved by using the thermal type metering flow sensor is corrected on the basis of the electrical output corresponding to a reference flow rate achieved by using the thermal type reference flow sensor to thereby achieve a flow rate value.

In an aspect of the flowmeter according to the present invention, the flowmeter further comprises a metered flow rate detecting circuit constructed so as to contain the thermal type metering flow sensor, a reference flow rate detecting circuit constructed so as to contain the thermal type reference flow sensor, and a flow rate conversion circuit for performing conversion to the flow rate value corresponding to the electrical output corresponding to the metered flow rate achieved in the metered flow rate detecting circuit by using a reference flow rate calibration curve and a metered flow rate calibration curve which are achieved with respect to plural temperatures for a reference fluid, wherein the flow rate conversion circuit determines, on the basis of the electrical output corresponding to the reference flow rate achieved for the fluid under metering in the reference flow rate detecting circuit, a deviation amount of the temperature on the reference flow rate calibration curve corresponding to the electrical output corresponding to the reference flow rate from a reference temperature, achieves a temperature correction amount to the metered flow rate calibration curve of the reference temperature on the basis of the deviation amount, and converts to the flow rate value of the fluid under metering on the basis of the electrical output corresponding to the metered flow rate of the fluid under metering by using the metered flow rate calibration curve for the reference temperature and taking the temperature correction amount into consideration.

In an aspect of the flowmeter according to the present invention, with respect to fluid different from the reference fluid, the flow rate conversion circuit determines a second temperature on a reference flow rate calibration curve which corresponds to the electrical output corresponding to a reference flow rate achieved at a first temperature, determines a third temperature on the metered flow rate calibration curve at a certain flow rate corresponding to the electrical output corresponding to the metered flow rate achieved at the certain flow rate at the first temperature, and achieves the ratio of the difference between the first temperature and the third temperature to the difference between the first temperature and the second temperature, and the flow rate conversion circuit multiplies the deviation amount by the ratio to thereby achieve the temperature correction amount.

In an aspect of the flowmeter according to the present invention, the flow rate conversion circuit converts the flow rate value of the fluid under metering to a volumetric flow rate value of the fluid under metering by using a specific gravity calibration curve indicating the relationship between the electrical output corresponding to the reference flow rate and the specific gravity. In an aspect of the present invention, the thermal type metering flow sensor has a first fin plate projecting into the metering flow path for thermal interaction with the fluid, and the thermal type reference flow sensor has a second fin plate projecting into the reference flow path for thermal interaction with the fluid.

According to the present invention, in order to attain the above object, there is also provided a method of metering a flow rate of fluid by making the fluid under metering flow into a metering flow path, achieving the electrical output corresponding to a metered flow rate of the fluid under metering in said metering flow path by an electrical circuit constructed so as to contain a thermal type flow sensor disposed in the metering flow path by utilizing the fact that a heat absorption amount from the thermal type flow sensor to the fluid under metering corresponds to the metered flow rate of the fluid under metering in the metering flow path, and performing conversion to the flow rate value corresponding to the electrical output corresponding to the metered flow rate by using pre-created calibration curves, wherein:

the calibration curve is created for a reference fluid;

the fluid under metering is filled in a reference flow path so as to freely flow therethrough, and the electrical output corresponding to a reference flow rate of the fluid under metering in the reference flow path is achieved by an electrical circuit constructed so as to contain a thermal type reference flow sensor disposed in the reference flow path by utilizing the fact that a heat absorption amount from the thermal type reference flow sensor to the fluid under metering corresponds to the reference flow rate of the fluid under metering in the reference flow path; and the output-corresponding value corresponding to the electrical output corresponding to the metered flow rate or the flow rate value achieved by the conversion using the calibration curve is corrected by using the electrical output corresponding to the reference flow rate, thereby correcting the error of the flow rate value due to the difference in thermal property of the fluid under metering from the reference fluid.

In an aspect of the flow rate metering method according to the present invention, the correction of the output-corresponding value corresponding to the electrical output corresponding to the metered flow rate is performed by subtracting, from the square value of the electrical output corresponding to the metered flow rate of the fluid under metering, a correction term of a result achieved by subtracting the square value of the electrical output corresponding to the reference flow rate achieved in advance for the reference fluid from the square value of the electrical output corresponding to the reference flow rate of the fluid under metering. In an aspect of the present invention, the temperature is measured, and the amount corresponding to a value at the measured temperature is used as the electrical output corresponding to the reference flow rate achieved in advance for the reference fluid when the correction term is achieved. In an aspect of the present invention, the correction term contains a correction coefficient for correcting the difference in characteristic between the thermal type flow sensor and the thermal type reference flow sensor.

In an aspect of the flow rate metering method according to the present invention, the correction of the flow rate value achieved by the conversion using the calibration curve is performed by multiplying the flow rate value achieved through the conversion by a correction parameter corresponding to the electrical output corresponding to the reference flow rate. In an aspect of the present invention, the temperature is measured, and the value at the measured temperature is used as the correction parameter.

According to the present invention, in order to attain the above object, there is also provided a flowmeter for metering a flow rate of fluid passing through a housing by feeding the fluid into the housing, stocking the fluid in the housing and feeding out the fluid to the outside of the housing, comprising:

a metering flow path disposed in the housing for passing the fluid in connection with the feed-in or feed-out of the fluid into/from said housing; a reference flow path disposed in the housing, the fluid stocked being filled in the reference flow path so as to freely flow; a first thermal type flow sensor disposed in the metering flow path; a second thermal type flow sensor disposed in the reference flow path; a first flow rate detection circuit constructed so as to contain the first thermal type flow sensor; and a second flow rate detection circuit constructed so as to contain the second thermal type flow sensor, wherein conversion from both of the first output-corresponding value corresponding to a first output value achieved in the first flow rate detection circuit on the basis of the thermal interaction between the fluid in said metering flow path and the first thermal type flow sensor and the second output-corresponding value corresponding to a second output value achieved in the second flow rate detection circuit on the basis of the thermal interaction between the fluid in the reference flow path and the second thermal type flow sensor to the flow rate value is performed on the basis of a correction output-corresponding value achieved by correcting the first output-corresponding value on the basis of the second output-corresponding value by using a calibration curve for reference fluid.

According to the present invention, in order to attain the above object, there is also provided a flowmeter for metering a flow rate of fluid passing through a housing by feeding the fluid into the housing, stocking the fluid in the housing and feeding out the fluid to the outside of the housing, comprising:

a metering flow path disposed in the housing for passing the fluid in connection with the feed-in or feed-out of the fluid into/from said housing; a reference flow path disposed in the housing, the fluid stocked being filled in the reference flow path so as to freely flow; a first thermal type flow sensor disposed in the metering flow path; a second thermal type flow sensor disposed in the reference flow path; a first flow rate detection circuit constructed so as to contain the first thermal type flow sensor; and a second flow rate detection circuit constructed so as to contain the second thermal type flow sensor, wherein conversion to a flow rate value is performed by using a calibration curve for reference fluid on the basis of a first output-corresponding value corresponding to a first output value achieved in the first flow rate detection circuit on the basis of the thermal interaction between the fluid in the metering flow path and the first thermal type flow sensor, and a corrected flow rate value is achieved by multiplying the flow rate value by a correction parameter corresponding to a second output value achieved in the second flow rate detection circuit on the basis of the thermal interaction between the fluid in said reference flow path and said second thermal type flow sensor.

In an aspect of the flowmeter according to the present invention, wherein the metering flow path and the reference flow path are formed in a flow rate metering portion disposed in the housing, an entrance of the metering flow path is formed to open toward a fluid reservoir portion formed in the housing so as to intercommunicate with a fluid inlet pipe formed in the housing, an exit of the metering flow path intercommunicates with a fluid outlet pipe formed in the housing, and an entrance and exit of the reference flow path are formed to open toward the fluid reservoir portion.

In an aspect of the flowmeter according to the present invention, the first thermal type sensor has a first fin plate projecting into the metering flow path for the thermal interaction with the fluid, and the second thermal type flow sensor has a second fin plate projecting into the reference flow path for the thermal interaction with the fluid.

The reason why the flow rate metering precision is not reduced by the present invention even when the composition of fluid under metering is different from that of reference fluid will be described below.

The following matters have been found as a result of examination in the difference in thermal property due to the difference in composition with respect to kerosene. That is, through the measurements of the dependence of thermal conductivity on kerosene composition (the deviation of the thermal conductivity of kerosene under metering from the thermal conductivity of reference kerosene), the dependence of specific heat on kerosene composition (the deviation of the specific heat of kerosene under metering from the specific heat of reference kerosene), the dependence of density on kerosene composition (the deviation of the density of kerosene under metering from the density of reference kerosene) and the dependence of kinetic viscosity on kerosene composition (the deviation of the kinetic viscosity of kerosene under metering from the kinetic viscosity of reference kerosene), it has been found that the dependence of kinetic viscosity on kerosene composition is more remarkable as compared with the thermal conductivity, the specific heat and the density. That is, the deviations of the thermal conductivity, the specific heat and the density are within about ±1% at maximum, however, the deviation of the kinetic viscosity is equal to ±10% or more.

Furthermore, it has been also found that the deviation of the kinetic viscosity affects the metered flow rate value of fluid under metering. According to the review of the magnitude of the effect, when a flow sensor having a heat-transfer member designed in a flat-plate shape so that fluid under metering flows along the flat plate as disclosed in JP-A-11-118566 is used, there are an effect of natural convection for the flow rate of zero and an effect of forced convection according to a theoretical analysis based on models. When the kinetic viscosity is represented by $v$, the effect of the natural convection is proportional to $v^{-1/4}$, and the effect of the forced convection is proportional to $v^{-1/6}$. As described above, the effect of the natural convection is greater than the effect of the forced convection.

A contributory share of the convection to the flow rate value is not directly relevant to the actual flow rate of fluid flowing into a flow path, and thus it is expected to enhance the flow rate metering precision by removing the effect of the convection on the flow rate metering. The contributory part by the natural convection in the convection contributory share is independent on the flow in a metering flow path of fluid under metering, and it can be taken out as an output of a flow rate detection circuit in a reference flow path filled with the fluid capable of freely flowing as in the case of the flow rate metering in the metering flow path.

On the other hand, a contributory part by the forced convection is appended to the flow of the fluid under metering, and it is impossible to achieve the effect concerned separately from the flow. However, the effect of the contributory part by the forced convection is smaller than the effect of the contributory part by the natural convection, so that the flow rate metering precision can be enhanced by removing only the contributory part based on the natural convection through correction.

When an output voltage value achieved from a flow rate detection circuit containing a flow sensor disposed in the metering flow path is converted to a flow rate value, the relationship between the flow rate and the square value of the output voltage achieved by actual measurements for reference fluid (for example, kerosene serving as a reference) is used as a calibration curve. Accordingly, when the reference fluid is metered, the conversion to the flow rate value is accurately performed, however, when fluid different from the reference fluid is metered, a measurement error corresponding to the difference in thermal property between the fluid under metering and the reference fluid occurs. Therefore, according to the present invention, in order to detect the difference in thermal property of the fluid under metering from the reference fluid, a reference flow rate based on natural convection of the fluid under metering under a free-flowing state in the reference flow path is achieved. FIG. 21 is a graph showing variation of the relationship between the kinetic viscosity and the output voltage value of the flow rate detection circuit (reference flow rate detection circuit) containing the reference flow sensor due to the difference in kinds of kerosene. It is found that there is a great correlation between the kinetic viscosity and the output voltage of the reference flow rate detection circuit.

By using the output value of the reference flow rate detection circuit thus achieved, the output-corresponding value corresponding to the output voltage value of the flow rate detection circuit (metered flow rate detection circuit) containing the flow sensor in the metering flow path is corrected, or the flow rate value achieved by the conversion using the calibration curves created for the reference fluid is corrected, whereby the error of the flow rate value due to the difference in thermal property of the fluid under metering from the reference fluid can be corrected and thus the flow rate metering precision can be enhanced.

BRIEF DESCRIPTION OF THE DRAWINGS

FIG. 17 is a graph showing the difference ΔVh or ΔVh' of the metered flow rate output Vh of each sample kerosene from the metered flow rate output Vh of a sample kerosene a;

FIG. 28 is a graph showing a metering error in the flow rate metering.

BEST MODE FOR CARRYING OUT THE INVENTION

Embodiments of the present invention will be described with reference to the accompanying drawings.

Figure 1:
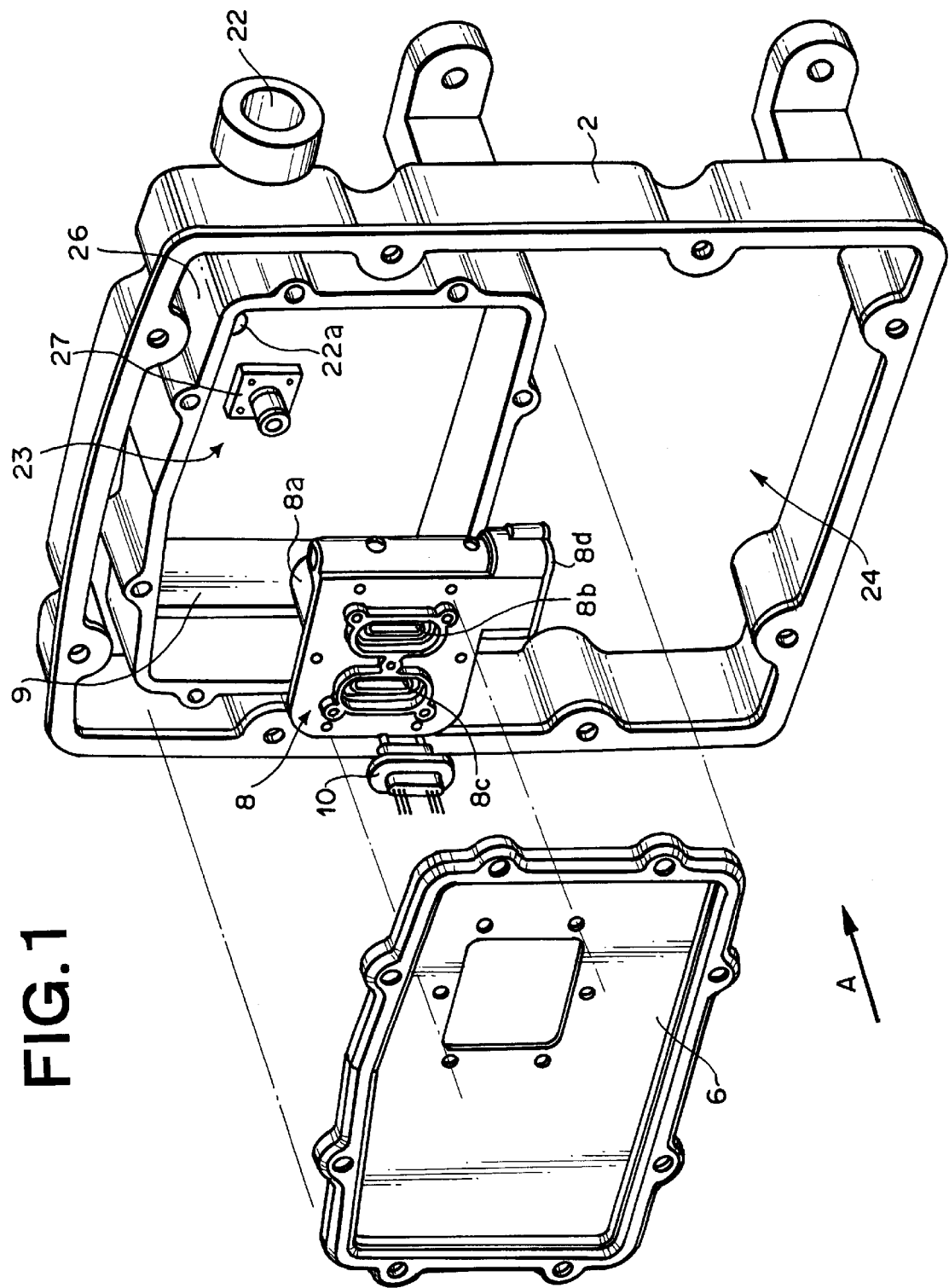
FIG. 1 is a schematic exploded perspective view showing the overall construction of a flowmeter according to the present invention.

FIG. 1 is a schematic exploded perspective view showing a part of the construction of an embodiment of a flowmeter according to the present invention. A housing main body member 2 of the flowmeter is formed of die-casting of aluminum, zinc or the like, and an outer lid member (not shown) formed of die-casting of aluminum, zinc or the like is fitted to the housing main body member 2 in a specific direction (direction of an arrow A) by screws. A fluid outlet pipe 22 is formed at one side of the upper portion of the back side of the housing main body member 2, and a fluid inlet pipe (not shown) is formed at the other side.

A recess portion 23 for a reservoir portion is formed at the upper half portion of the housing main body member 2. The outer peripheral surface of an inner lid member 6 formed of die-casting of aluminum, zinc or the like is fitted to the end face of the inner wall 26 of the recess portion for the reservoir portion in the direction of the arrow A by screws so as to close the recess portion 23 for the reservoir portion. When the fitting is performed, a rubber seal (cork-added rubber seal, etc.) is interposed to prevent leakage of fluid from the fitting portion, whereby a fluid reservoir portion in which fluid is temporarily stocked or through which the fluid flows is formed between the housing main body member 2 and the inner lid member 6. An opening which intercommunicates with the fluid inlet pipe and opens at the recess portion 23 for the reservoir portion is formed in the housing main body member 2, and a connection opening 22a which intercommunicates with the fluid outlet pipe 22 and opens at the recess portion 23 for the reservoir portion is formed in the housing main body member 2.

Figure 2:
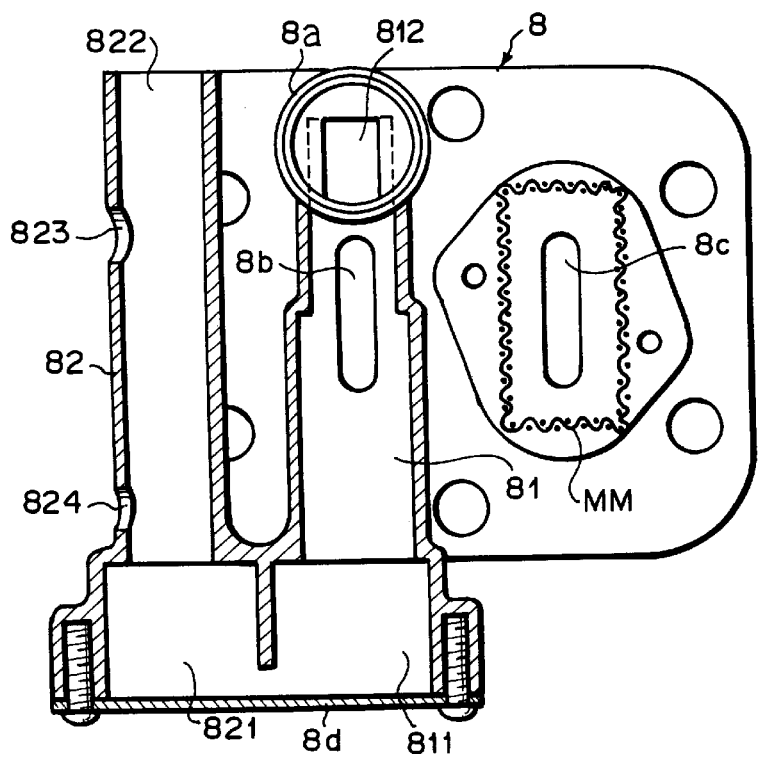
FIG. 2 is a cross-sectional view showing a flow-rate metering portion.
Figure 3:
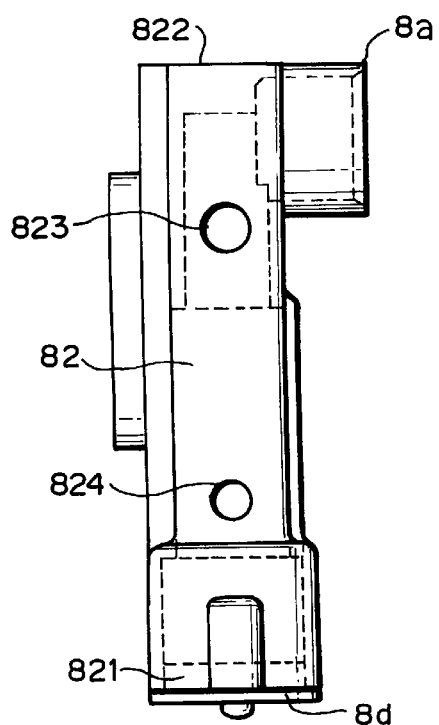
FIG. 3 is a side view showing the flow-rate metering portion.

A flow-rate metering portion 8 to be disposed in the fluid reservoir portion is attached to the inner lid member 6. FIG. 2 is a cross-sectional view showing the flow rate metering portion 8, and FIG. 3 is a side view thereof. A fluid flow path 81 extending in the up-and-down direction (vertical direction) is formed in the flow rate metering portion 8. An entrance 811 of the fluid flow path 81 is located at the lower portion of the flow rate metering portion 8. A projecting portion 8a projecting in the direction of the arrow A is fixed to the exit 812 located at the upper portion of the fluid flow path 81, and the projecting portion 8a is connected to the connection opening 22a of the housing main body member 2 through a joint member 27 by fitting the inner lid member 6 to the housing main body member 2, whereby the exit 812 of the fluid flow path of the flow rate metering portion 8 and the fluid outlet pipe 22 are made to intercommunicate with each other.

Figure 4:
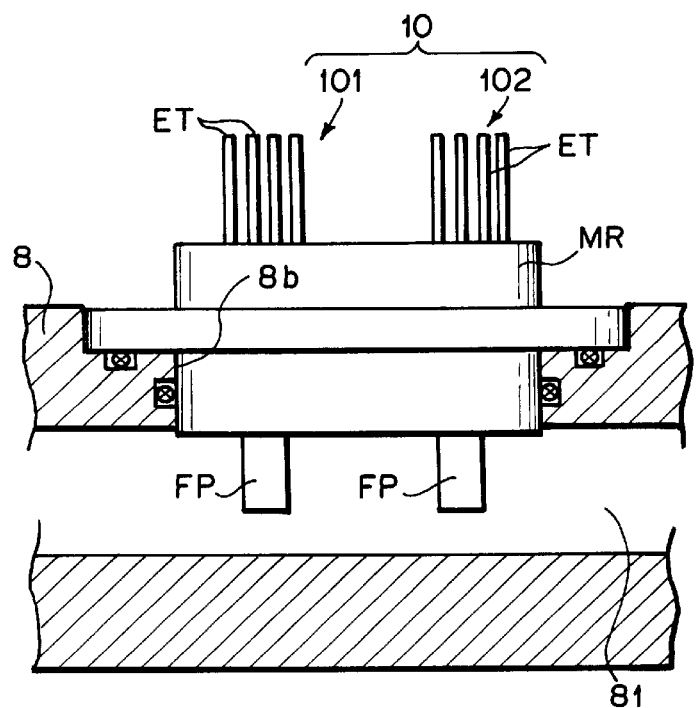
FIG. 4 is a diagram showing a fixing portion of a flow sensor.
Figure 5:
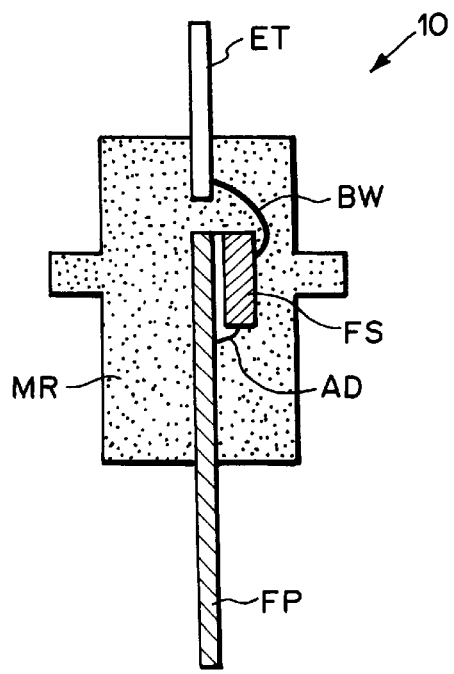
FIG. 5 is a cross-sectional view showing a flow sensor.

A thermal type flow sensor (with a fluid temperature detecting sensor) 10 having a fin plate serving as a heat transfer member for heat exchange is inserted in each of sensor mount holes 8b and 8c formed in the direction of the arrow A in the flow rate metering portion 8 (in FIG. 1, only one thermal type flow sensor is illustrated). FIG. 4 shows a fixing portion of the flow sensor 10, and FIG. 5 is a cross-sectional view showing the flow sensor 10. The flow sensor 10 which is inserted in the sensor mount hole 8b while an O-ring is interposed therebetween is projected into the fluid flow path 81. The flow sensor 10 which is inserted in the sensor mount hole 8c while an O-ring is interposed therebetween is projected into the fluid reservoir space.

The flow sensor 10 contains a flow sensor portion 101 and a fluid temperature detecting sensor portion 102. In the flow sensor portion 101, a fin plate FP and a flow sensing portion FS are joined to each other by adhesive material AD having excellent thermal conductivity, and electrode pads of the flow sensor FS and external electrode terminals ET are connected to one another by bonding wires BW. The fluid temperature detecting sensor portion 102 may be constructed by using a fluid temperature sensing portion in place of the flow sensing portion FS in the flow sensor portion 101 and equipping external electrode terminals ET corresponding to the fluid temperature sensor. Devices disclosed in JP-A-11-118566 may be used as the flow sensing portion and the fluid temperature sensing portion. The flow sensor portion 101 and the fluid temperature detecting sensor portion 102 are sealed and integrated into one body by common mold resin MR.

As shown in FIG. 2, a metal mesh cover MM for covering the fin plate FT of the flow sensor 10 inserted in the sensor mount hole 8c is attached to the flow metering portion 8. The metal mesh cover MM is used to prevent the fin plate FP of the flow sensor 10 from being effected by the fluid flow caused by fluid supply although the fin plate FP may be effected by the fluid flow caused by natural convection. This flow sensor constitutes a reference flow rate detecting circuit for detecting the difference in thermal property of fluid under metering from reference fluid used to create a calibration curve used when the output value achieved from a metered flow rate detecting circuit containing the flow sensor 10 inserted in the sensor mount hole 8b is converted to the flow rate value.

As shown in FIG. 1, a fluid flow path defining member 9 is formed in the recess portion 23 for the reservoir portion as shown in FIG. 1. The fluid flow path defining member 9 defines the fluid flow path of the fluid flowing in from the opening in the fluid reservoir, and serves to uniformly guide the fluid through a slender opening extending in the vertical direction formed between the flow path defining member 9 and the inner lid member 6 to the area in which the flow rate metering portion 8 is disposed.

As not shown, an analog circuit board electrically-connected to the external electrode terminals ET of the flow sensor 10 is fixed to the front surface side of the inner lid member 6. Furthermore, a digital circuit board constituting the flow rate detecting circuit together with the analog circuit board, a transformer constituting a power supply circuit portion and a circuit member such as an input/output terminal portion for the flowmeter, etc. are fixed to the outer lid member as not shown. Particularly, the transformer and the input/output terminal portion are disposed in a recess portion 24 for the circuit member, which is formed at the lower half portion of the housing main body member 2.

As shown in FIGS. 1 to 3, the fluid flow path 81 of the flow rate metering portion 8 extends in the up-and-down direction (vertical direction). An auxiliary flow path 82 extending in parallel to the fluid flow path 81 is formed in the flow rate metering portion 8. The auxiliary flow path 82 has a lower end portion opening serving as a fluid feed-out port 821, an upper end portion opening serving as a first fluid feed-in port 822 and two side portion openings which are located at different heights and serve as second and third fluid feed-in ports 823, 824.

The auxiliary flow path 82 acts to feed in the fluid stocked in the fluid reservoir portion from the fluid feed-in ports 822, 823, 824, feed out the fluid from the fluid feed-out port 821, and guide the fluid through an intercommunication path containing a bottom plate 8d to the fluid flow path entrance 811 on the basis of the fluid suction force from the entrance 811 into the fluid flow path 81 when the flow rate metering is carried out. The fluid feed-in ports 822, 823 and 824 are different in inner diameter, and the inner diameter thereof is set to a smaller value as the distance from the fluid feed-out port 821 is reduced, whereby the flow rate of the fluid which is fed into the auxiliary flow path 82 from positions different in height can be averaged.

Figure 6:
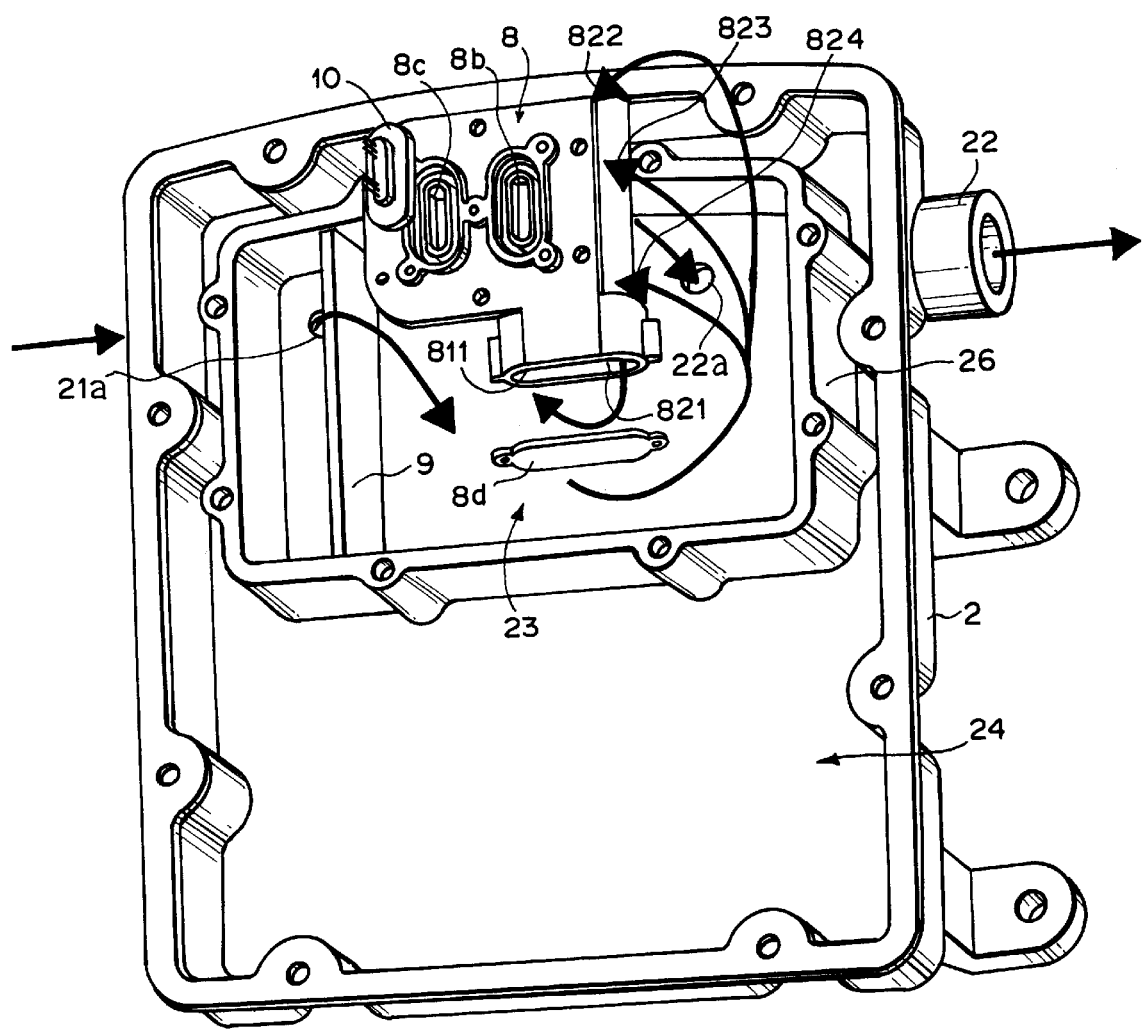
FIG. 6 is an exploded perspective view showing fluid flow in the flowmeter according to the present invention.

FIG. 6 is an exploded perspective view showing the fluid flow in this embodiment. In FIG. 6, the flowing direction of the fluid is indicated by an arrow. The fluid supplied from a fluid supply source (not shown) through a pipe is passed from the fluid inlet pipe through the opening 21a into the fluid reservoir portion. The fluid thus supplied goes over the flow path defining member 9 and reaches the area in which the flow rate metering portion 8 is disposed. The fluid is sucked through the auxiliary flow path 82 into the fluid flow path 81, passed through the fluid flow path exit 812 and the connection opening 22a, discharged from the fluid outlet pipe 22 and then supplied to a fluid requesting device. Afterwards, if there is any fluid demand at the fluid requesting device, the fluid is supplied from the fluid supply source through the auxiliary flow path 82 and the fluid flow path 81 in the reservoir portion of the flowmeter to the fluid requesting device.

In this embodiment, the auxiliary flow path 82 is disposed so that the distance from the opening 21a is larger than the distance from the opening 22a, and the auxiliary flow path 82 is adjacent to the inner wall 26 at the right side in the fluid reservoir portion, so that horizontal-direction flow which is directed to the right-side inner wall 26 and averaged with respect to the up-and-down position occurs in the fluid in the fluid reservoir portion. Therefore, the temperature distribution in the fluid reservoir portion containing the flow rate metering portion 8 is sufficiently made uniform, and the precision of the flow rate metering can be enhanced.

Figure 7:
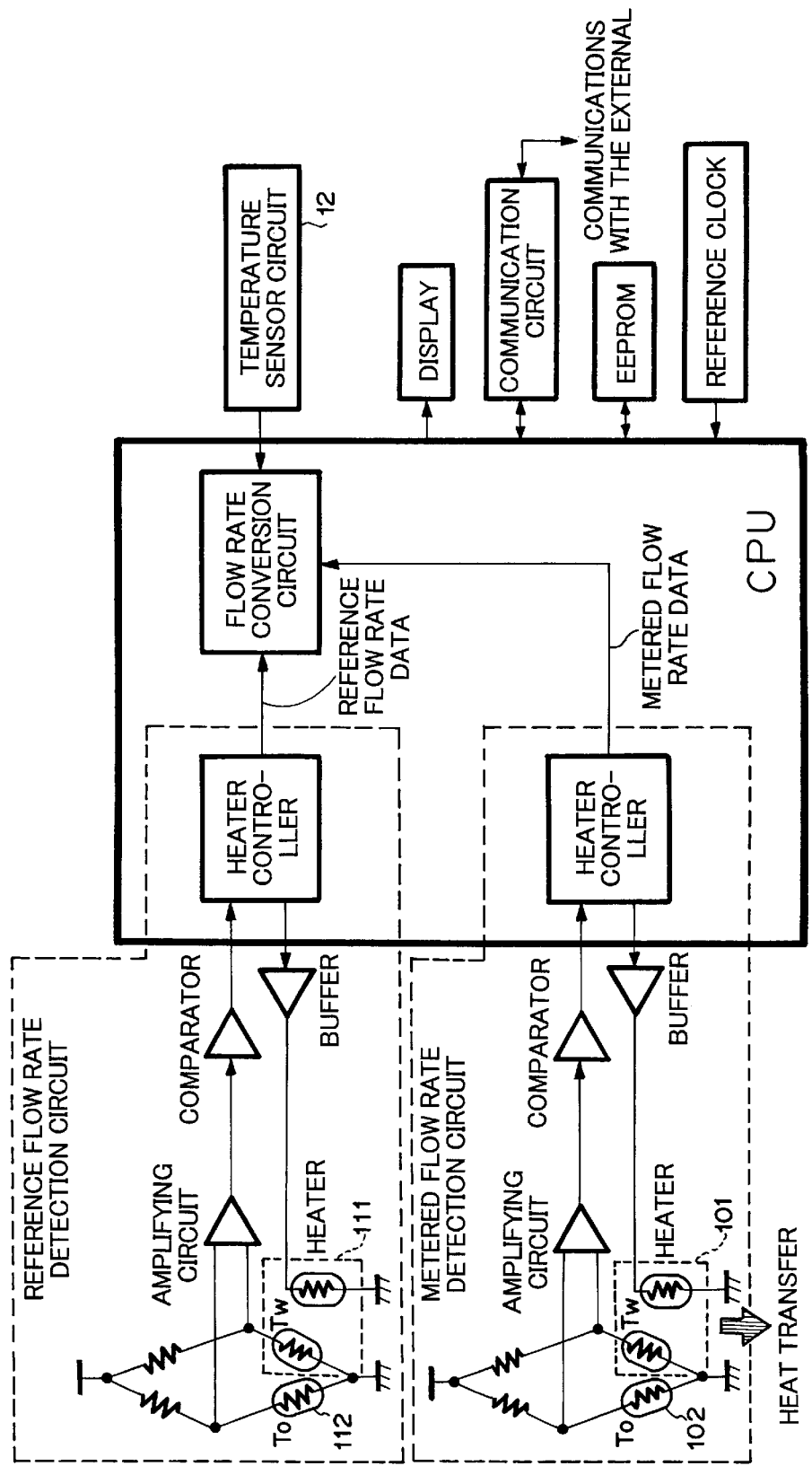
FIG. 7 is a block diagram showing the construction of an electrical circuit portion of the flowmeter according to the present invention.

The flow rate of the fluid in the fluid flow pipe 81 is metered by using a metered flow rate detecting circuit as shown in FIG. 7 which contains the flow sensor portion 101 and the fluid temperature detecting sensor portion 102. In FIG. 7, in the flow sensor portion 101, a heater and a temperature sensing resistor Tw are laminated through an insulating film to form a flow sensing portion, and a part of the heating value of the heater is transferred through the fin plate FP to the fluid flowing in the fluid flow path 81. The temperature sensing effected by the thermal interaction with the fluid is executed by the temperature sensing resistor Tw. The temperature sensing resistor Tw, two resistors and a temperature sensing resistor To of the fluid temperature detecting portion of the fluid temperature detecting sensor portion 102 constitute a bridge circuit. The output of the bridge circuit is amplified by an amplifying circuit and then compared with a predetermined value in a comparator, and the output of the comparator is input to a heater controller. The heater controller controls the heating of the heater of the flow sensor portion 101 through a buffer according to an input signal. This control is performed so that the temperature sensing resistor Tw of the flow sensor portion 101 keeps a predetermined temperature sensing state, that is, the input signal to the heater controller is kept to a predetermined value. This control state supports the instantaneous flow rate, and the data thereof is input to a flow rate conversion circuit.

The reference flow rate detecting circuit has the same construction as the metered flow rate detecting circuit except that a flow sensor portion 111 and a fluid temperature detecting sensor portion 112 similar to the flow sensor portion 101 and the fluid temperature detecting sensor portion 102 are contained, and performs the same flow rate detection. A reference flow rate thus achieved is varied in accordance with the composition of the fluid under metering or a thermal property corresponding to a physical value, for example, kinetic viscosity, so that the value of the flow rate metered by the metered flow rate detecting circuit can be corrected on the basis of the output of the reference flow rate detecting circuit.

A signal indicating the temperature of an analog circuit portion (containing most of the metered flow rate detecting circuit and the reference flow rate detecting circuit) is input from a temperature sensor circuit 12 containing a temperature sensor (not shown) to the flow rate conversion circuit. In the flow rate conversion circuit, operations such as the correction based on the analog circuit portion temperature, the correction based on the reference flow rate, etc. are carried out on the basis of metered flow rate data achieved by the metered flow rate detecting circuit, reference flow rate data achieved by the reference flow rate detecting circuit and analog circuit portion temperature data achieved by the temperature sensor circuit 12, and the conversion to the flow rate value by using the calibration curve is performed.

A display portion, a communication circuit, EEPROM and reference clocks are connected to CPU containing the heater control circuit and the flow rate conversion circuit as described above. The flow rate achieved is displayed on the display portion, and output to the communication circuit to be used for communications with the external.

An operation executed in the flow rate conversion circuit and a method of converting to the flow rate will be described.

(1) Setting of Calibration Curve, etc. and Storage into Memory:

First, calibration curves and numerical values used for the operation and the conversion are stored in EEPROM serving as a memory. These calibration curves and the numerical values are preset every flowmeter as follows. Even when there is some dispersion in the circuit characteristic among flowmeters, the setting on a flowmeter basis can reduce the effect of the dispersion.

Figure 8:
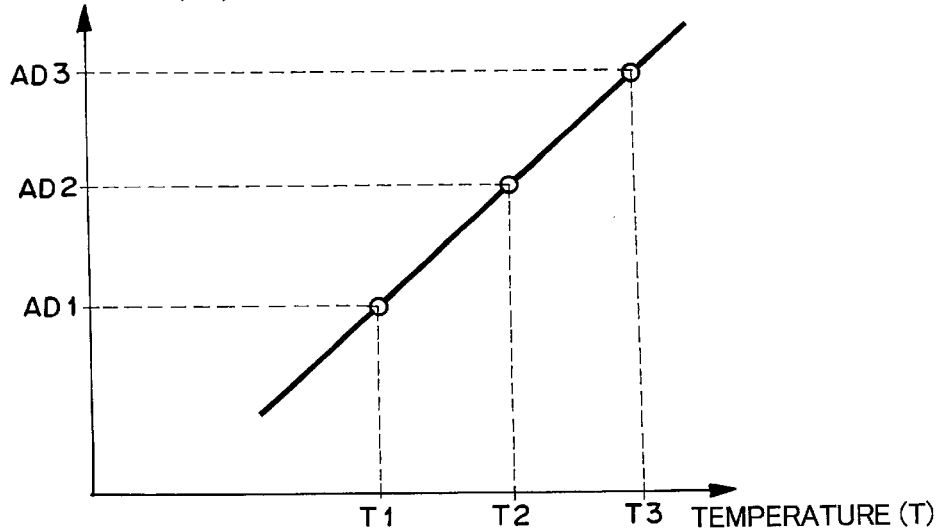
FIG. 8 is a graph showing the relationship between each of plural temperatures and the output of a temperature sensor circuit at each temperature.

As shown in FIG. 8, the relationship between each of plural temperatures T1 to T3 and each of the outputs AD1 to AD3 of the temperature sensor circuit 12 at the respective temperatures is achieved as a first calibration curve through measurements. The number of the plural temperatures is not limited to three, it may be equal to 2 or 4 or more.

Figure 9:
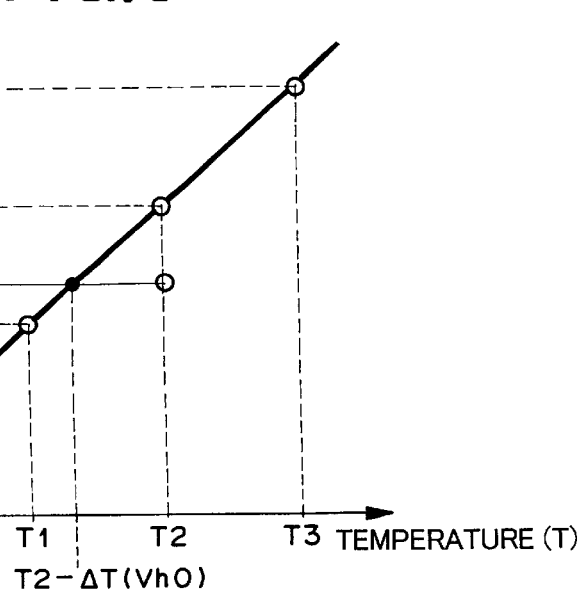
FIG. 9 is a graph showing the relationship between each of plural temperatures and a reference flow rate of reference kerosene at each temperature.

As shown in FIG. 9, the relationship between each of the plural temperatures T1 to T3 and each of reference flow rate data Vh0(B,T1), Vh0(B,T2), Vh0(B,T3) of reference kerosene B at the respective temperatures is achieved as a second calibration curve through measurements.

Figure 10:
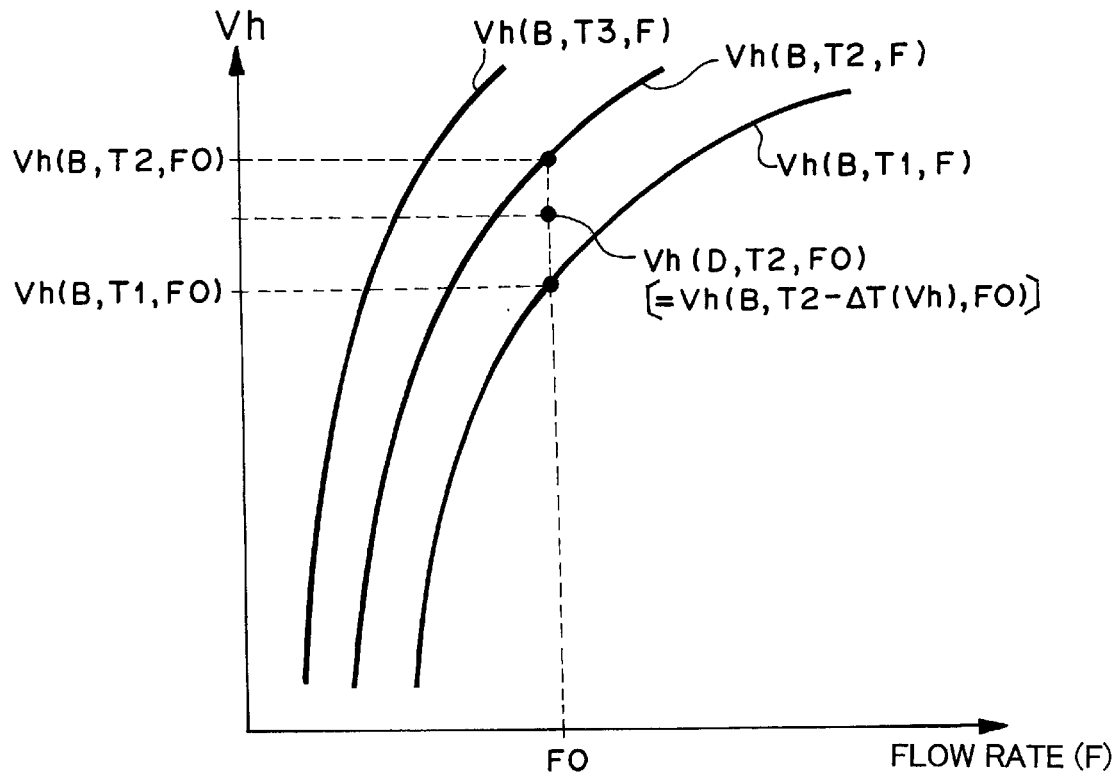
FIG. 10 is a graph showing the relationship of each of plural temperature, the flow rate of reference kerosene and a metered flow rate at each temperature.

As shown in FIG. 10, the relationship among each of the plural temperatures T1 to T3, and each of the flow rates F and each of metered flow rate data Vh(B,T1,F), Vh(B,T2,F) Vh(B,T3,F) of reference kerosene B at the respective temperatures is achieved as a third calibration curve through measurements.

Next, the reference flow rate data Vh0(D,T2) and the metered flow rate data Vh(D,T2,F0) of a flow rate F0 at a temperature T2 (first temperature) for kerosene D different from the reference kerosene B are achieved through measurements.

Figure 11:
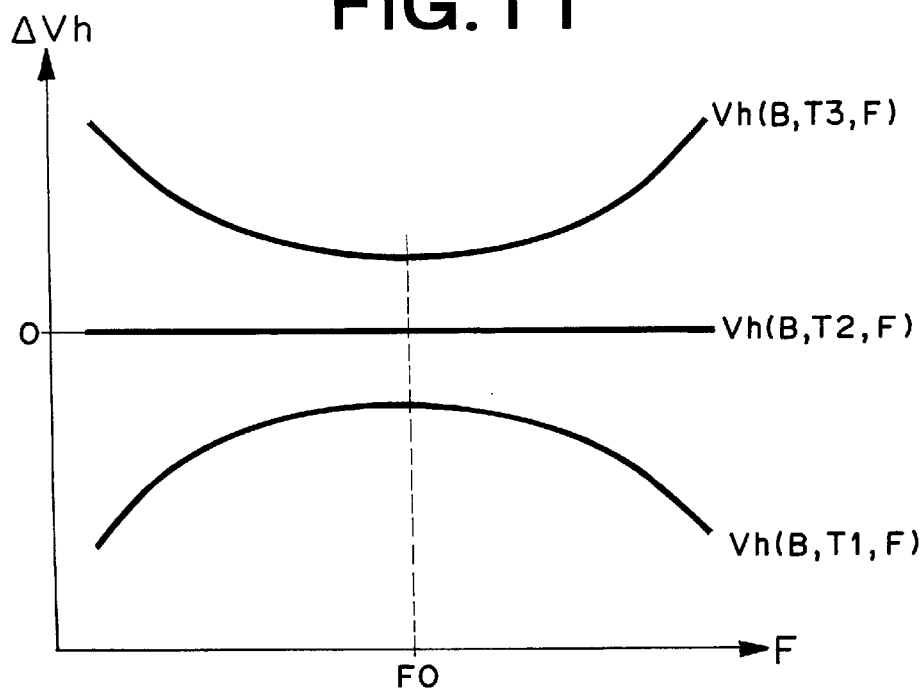
FIG. 11 is a graph showing ΔVh achieved by calculating the differences of metered flow rates Vh (B, T1, F), Vh(B, T3, F) at temperatures T1, T3 from a metered flow rate Vh (B, T2, F) at a temperature T2 for reference kerosene.

The flow rate F0 may be duly set, and there may be selected, for example, a flow rate F0 at which the absolute value of $\Delta h$ achieved by calculating the difference between the metered flow rate data Vh(B,T2,F) at the temperature T2 and each of the metered flow rate data Vh(B,T1,F), Vh(B,T3,F) at the other temperatures T1, T3 is minimum for the reference kerosene B as shown in FIG. 11. In FIG. 10, Vh(D,T2,F0) is located between the metered flow rate data Vh(B,T2,F0) and Vh(B,T1,F0) at the flow rate F0 for the reference kerosene B.

Figure 12:
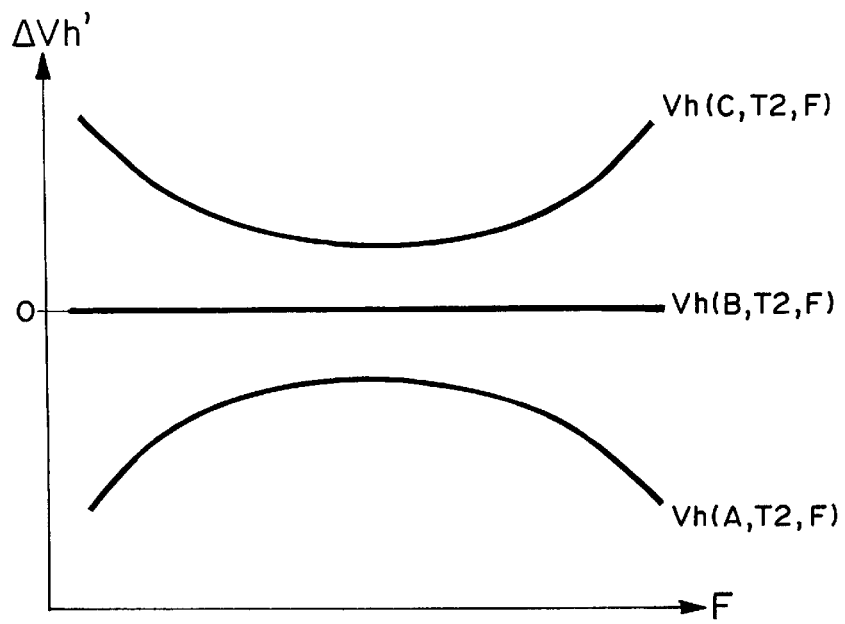
FIG. 12 is a graph showing ΔVh' achieved by calculating the differences of metered flow rates Vh(A, T2, F), Vh(C, T2, F) for kerosene A, C from a metered flow rate Vh(B, T2, F) for reference kerosene at the temperature T2.

FIG. 12 shows $\Delta Vh'$ achieved by calculating the difference between the metered flow rate data Vh(B,T2,F) for the reference kerosene and each of the metered flow rate Vh(A,T2,F), Vh(C,T2,F) for the other kinds of kerosene A, C at some temperature, for example, at the temperature T2. As is apparent from the comparison between FIG. 12 and FIG. 11, the metered flow rate data when the temperature is varied and the metered flow rate data when kerosene under metering is changed have a similar tendency with respect to Vh(B,T2,F). The present invention uses this fact, and the variation of the metered flow rate data caused by the change from the reference kerosene B to the kerosene under metering is replaced by the variation of the metering temperature for the reference kerosene B. Therefore, even when the kerosene under metering is different from the reference kerosene, the correction is performed by using plural calibration curves for the reference kerosene B which use the temperature as a parameter, thereby achieving an accurate flow rate.

Next, as shown in FIG. 9, a value $\Delta T(Vh0)$ representing how many degrees the temperature (second temperature) on the calibration curve of the reference kerosene B corresponding to the reference flow rate value Vh0(D,T2) for kerosene D is deviated from T2 (first temperature) is calculated on the basis of linear interpolation using the reference flow rate data Vh0(B,T1), Vh0(B,T2).

Furthermore, as shown in FIG. 10, a value $\Delta T(Vh)$ representing how many degrees the calibration curve temperature (third temperature) for the reference kerosene B corresponding to the metered flow rate value Vh(D,T2,F0) at the flow rate F0 for kerosene D is deviated from T2 (first temperature) is calculated on the basis of the linear interpolation using the metered flow rate data Vh(B,T1,F0), Vh(B,T2,F0).

The ratio of $\Delta T(Vh)$ and $\Delta T(Vh0)$, i.e. $R=\Delta T(Vh)/\Delta T(Vh0)$, is calculated. It has been found that even when another different kerosene is used as the kerosene D, the value of the ratio R is substantially unvaried.

The first to third calibration curves and the value of the ratio R thus achieved are stored in EEPROM serving as a memory.

(2) Flow Rate Metering of Kerosene Under Metering:

When the flow rate metering is actually carried out on kerosene E under metering, the following operation and conversion are carried out in the flow rate conversion circuit.

First, the linear interpolation using the first calibration curve is carried out on the basis of the output AD of the temperature sensor circuit 12 to achieve the temperature T of the kerosene E under metering.

Figure 13:
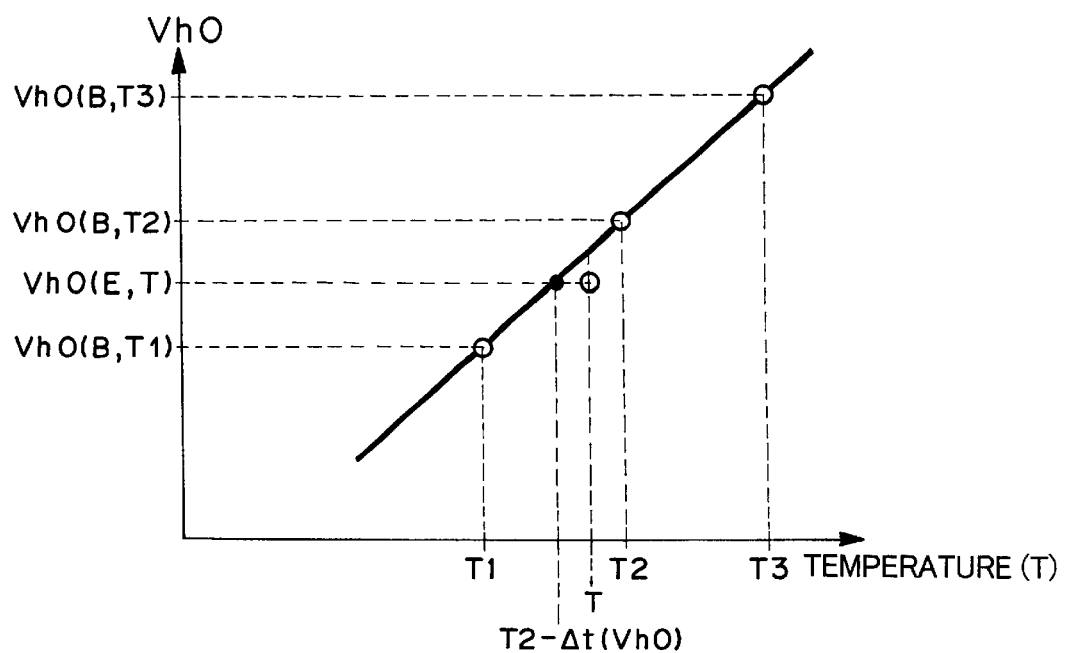
FIG. 13 is a graph showing Δt (Vh0) in the flow rate metering of kerosene under metering.

Subsequently, the reference flow rate data Vh0(E,T) at the temperature T for the kerosene E under metering is achieved, and a value $\Delta t(Vh0)$ (deviation amount) representing how many degrees the temperature on the second calibration curve for the reference kerosene B corresponding to the value of the reference flow rate Vh0(E,T) is deviated from the reference temperature T2 is calculated on the basis of the linear interpolation using the reference flow rate data Vh0(B,T2), Vh0(B,T1) as shown in FIG. 13.

Figure 14:
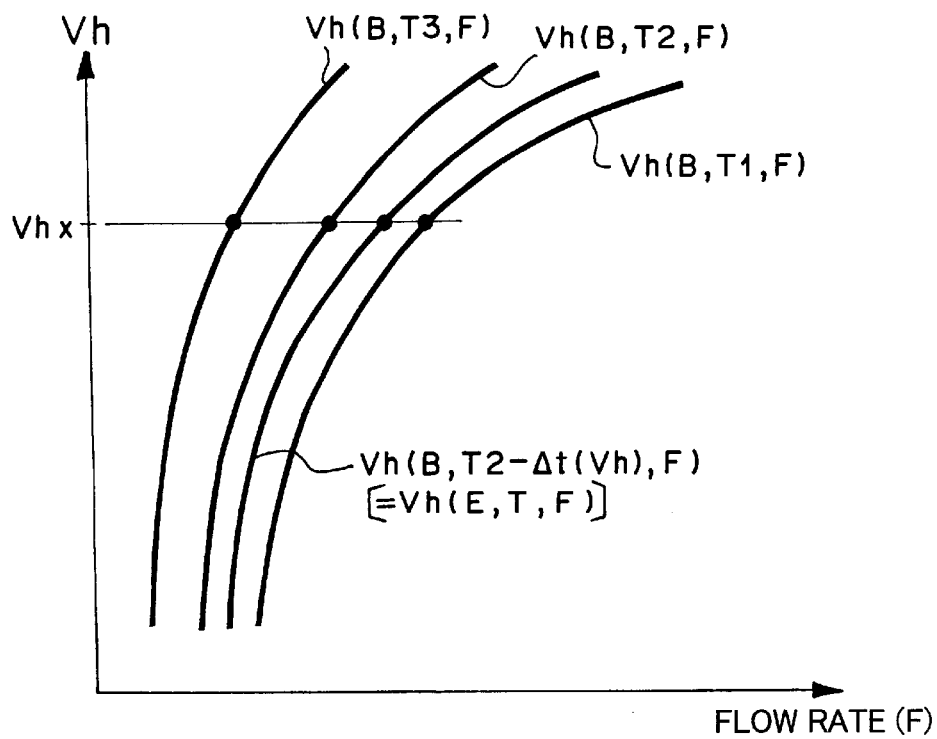
FIG. 14 is a graph showing Vh(B, T2−Δt(Vh), F)=Vh(E, T, F) in the flow rate metering of kerosene under metering.

$\Delta t(Vh0)$ is multiplied by the ratio R to achieve $\Delta t(Vh)=R \Delta t(Vh0)$ (temperature correcting amount), and $Vh(B,T2-\Delta t(Vh),F)=Vh(E,T,F)$ is achieved as a calibration curve of the temperature $T2-\Delta t(Vh)$ which compensates the temperature deviation of $\Delta t(Vh)$ with respect to the reference kerosene B as shown in FIG. 14. At this time, the linear interpolation is carried out by using the metered flow rate Vh(B,T1,F), Vh(B,T2,F).

The value of the flow rate F corresponding to the output value Vhx of the metered flow rate detecting circuit achieved at the temperature T for the kerosene E under metering is determined by using the calibration curve of $Vh(B,T2-\Delta t(Vh),F)$ for the reference kerosene B achieved as described above. The preparation of $Vh(B,T2-\Delta t(Vh),F)$ is not necessarily required to be carried out over all the flow rates or in the output range of the metered flow rate detecting circuit, and it may be prepared case by case in connection with only the output value Vhx of the metered flow rate detecting circuit which is achieved through the flow rate metering at the temperature T for the kerosene E under metering.

In this embodiment, the correction is carried out by converting the difference in thermal property of the kerosene E under metering from the reference kerosene B to the temperature difference, and the correcting operation containing the correction based on the actual temperature difference can be carried out, so that the quick processing can be performed.

Figure 15:
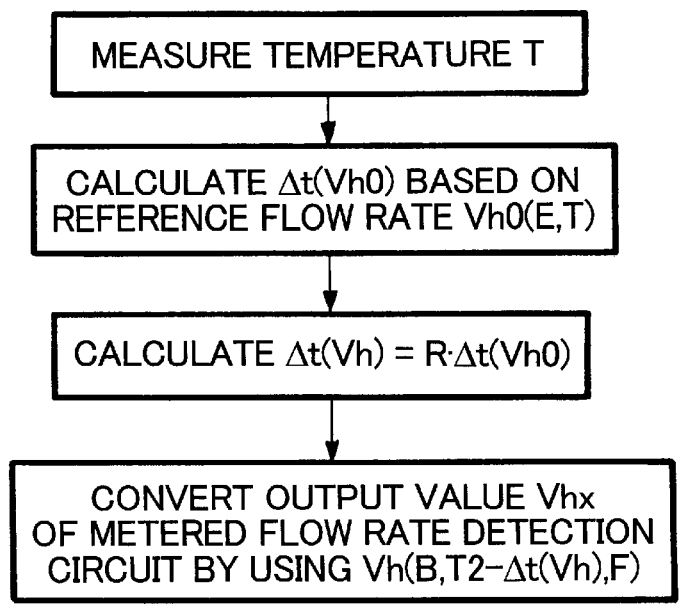
FIG. 15 is a diagram showing a flow of the flow rate metering of kerosene under metering.

FIG. 15 is a flowchart showing the flow rate metering of the kerosene E under metering as described above.

FIGS. 16 to 19 are graphs achieved in examples of the flow rate metering carried out by using the flowmeter according to the present invention. The flow rate metering was carried out on the following samples.

[a] reference kerosene (temperature of 25° C.: reference temperature)

[b] reference kerosene (temperature of 15° C.)

[c] reference kerosene (temperature of 35° C.)

[d] first kerosene different from reference kerosene

[e] second kerosene different from reference kerosene

[f] third kerosene different from reference kerosene

Figure 16:
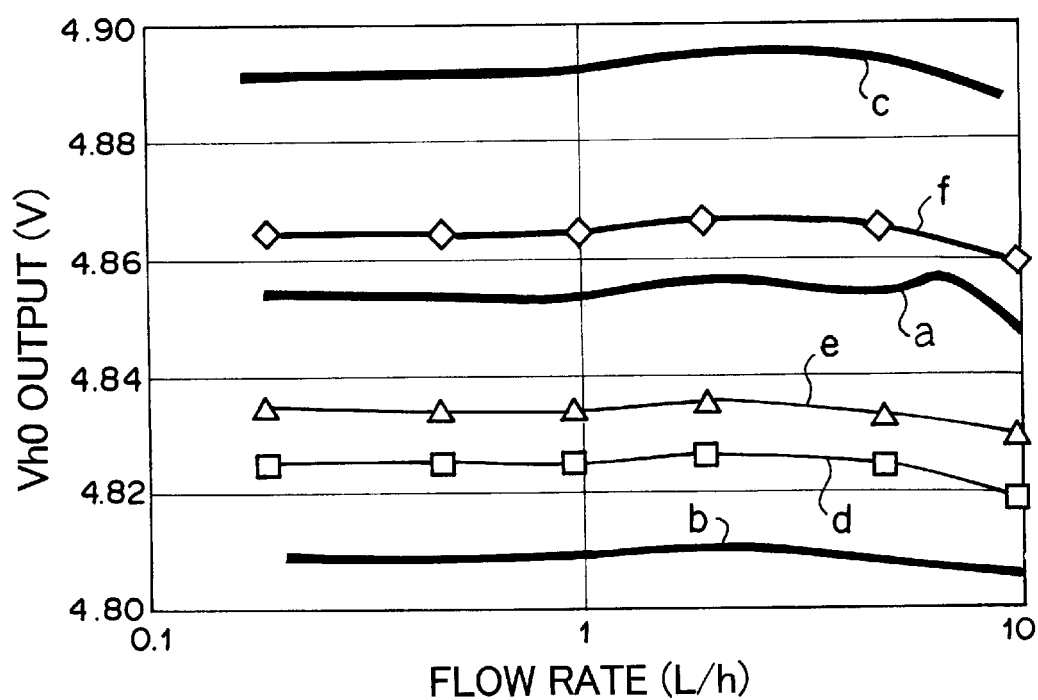
FIG. 16 is a graph showing a reference flow rate output Vh0 of each sample kerosene.
Figure 17:
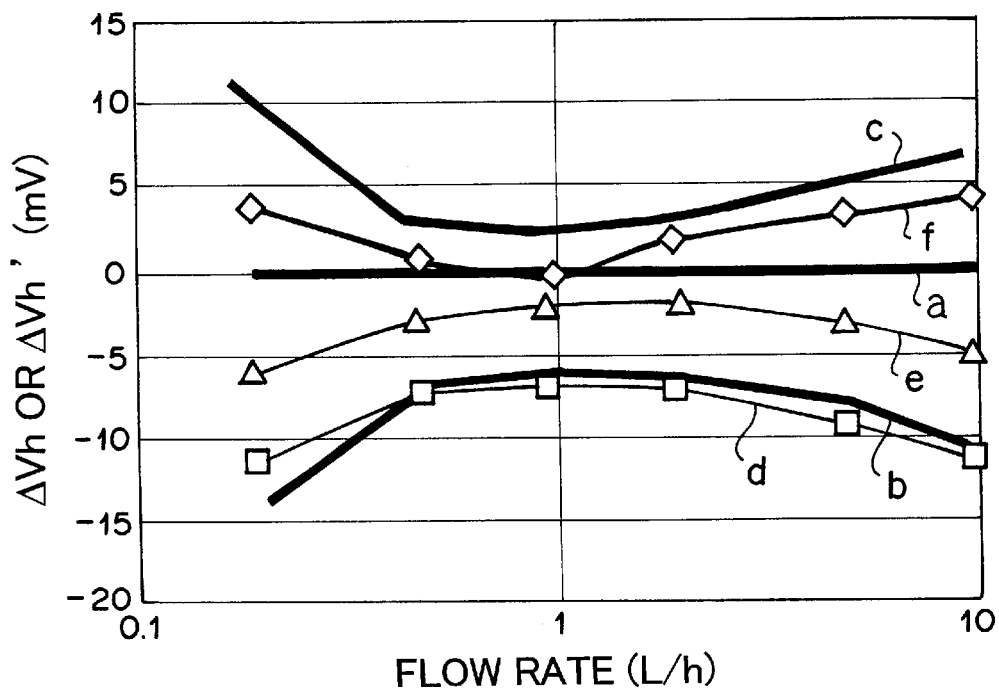

FIG. 16 shows the reference flow rate output Vh0 of each sample kerosene. FIG. 17 shows the difference $\Delta$Vh or $\Delta$Vh' of the metered flow rate output Vh of each sample kerosene from the metered flow rate output Vh of the sample kerosene a.

In this example, the sample kerosene d of the temperature 25° C. was used when the ratio R was calculated. $\Delta$t(Vh0) was equal to about 6.4° C., $\Delta$t(Vh) was equal to about 10.0° C. and R was equal to about 1.563.

Figure 18:
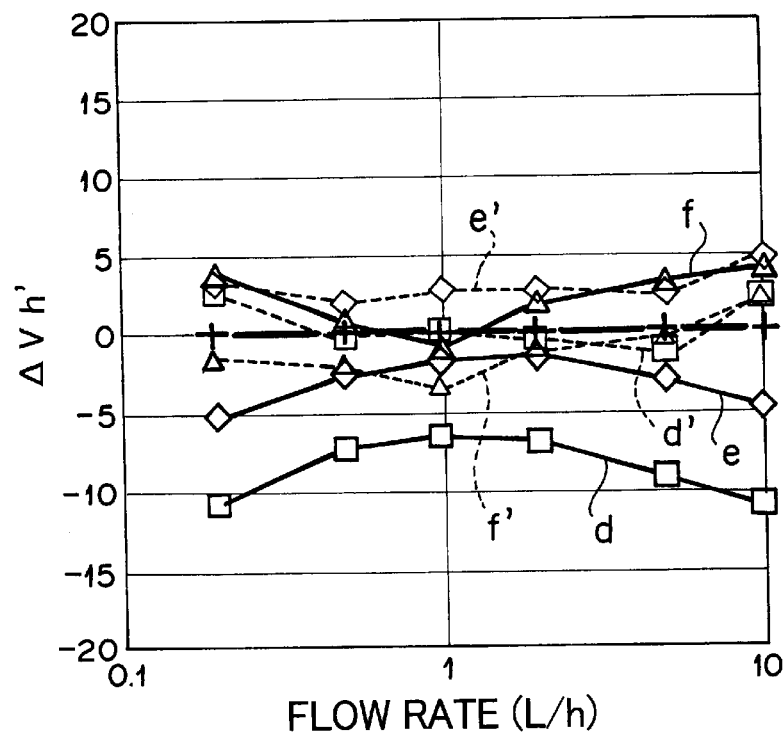
FIG. 18 is a graph showing the difference ΔVh' of the metered flow rate outputs Vh of sample kerosene d to f from the metered flow rate output Vh of the sample kerosene a, and corresponding values d' to f' after correction.
Figure 19:
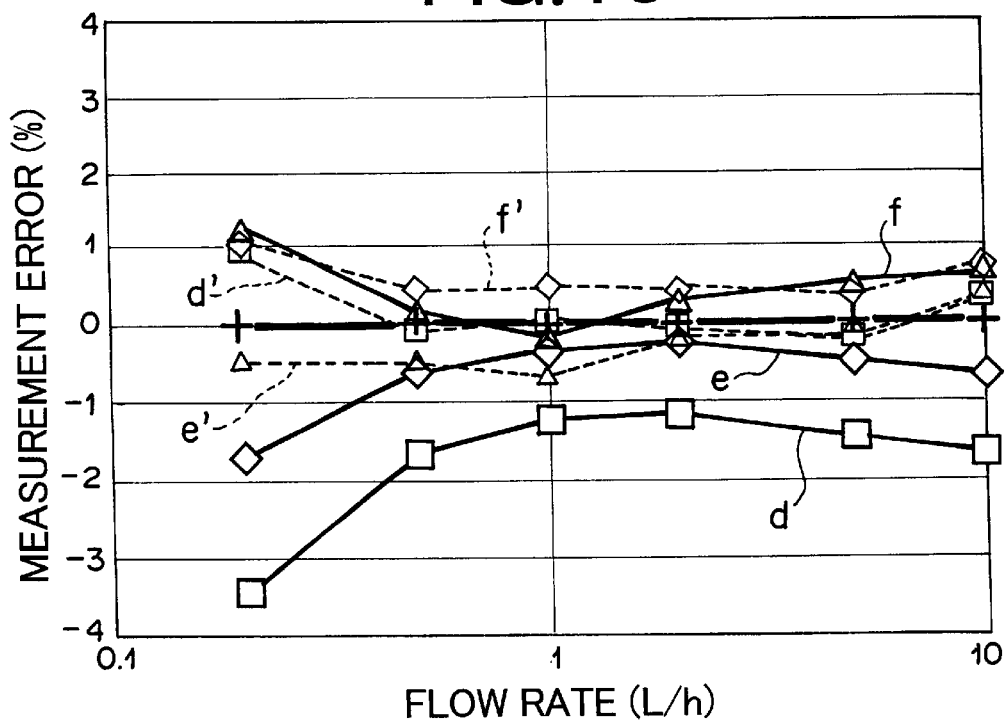
FIG. 19 is a graph showing FIG. 18 in terms of metering error.

FIG. 18 shows the differences $\Delta$Vh' of the metered flow rate outputs Vh of the sample kerosene d to f from the metered flow rate output Vh of the sample kerosene a, and the corrected values d' to f' thereof. FIG. 19 shows the conversion results of FIG. 18 to measurement errors.

From these results, it has been found that according to the present invention, the correction can be carried out on kerosene different from the reference kerosene by using the calibration curves prepared for the reference kerosene, whereby the flow rate metering can be carried out with high precision within an error of about 1% or less.

Next, a modification of the above-described embodiment will be described.

In this modification, the flow rate value achieved by the above-described embodiment is converted to a volumetric flow rate value. That is, the flow rate value achieved through the thermal flow rate metering in the above-described embodiment is basically a mass flow rate value reflecting the mass of kerosene under metering. In order to convert the mass flow rate value to the volumetric flow rate value, it is required to be divided by the specific gravity of kerosene under metering. As described above, there is some dispersion in the composition of kerosene to be supplied to kerosene consumers, and thus there is also some dispersion in specific gravity of kerosene. Accordingly, in order to convert the mass flow rate value to the volumetric flow rate value, the specific gravity of the kerosene under metering is required to be measured.

Figure 20:
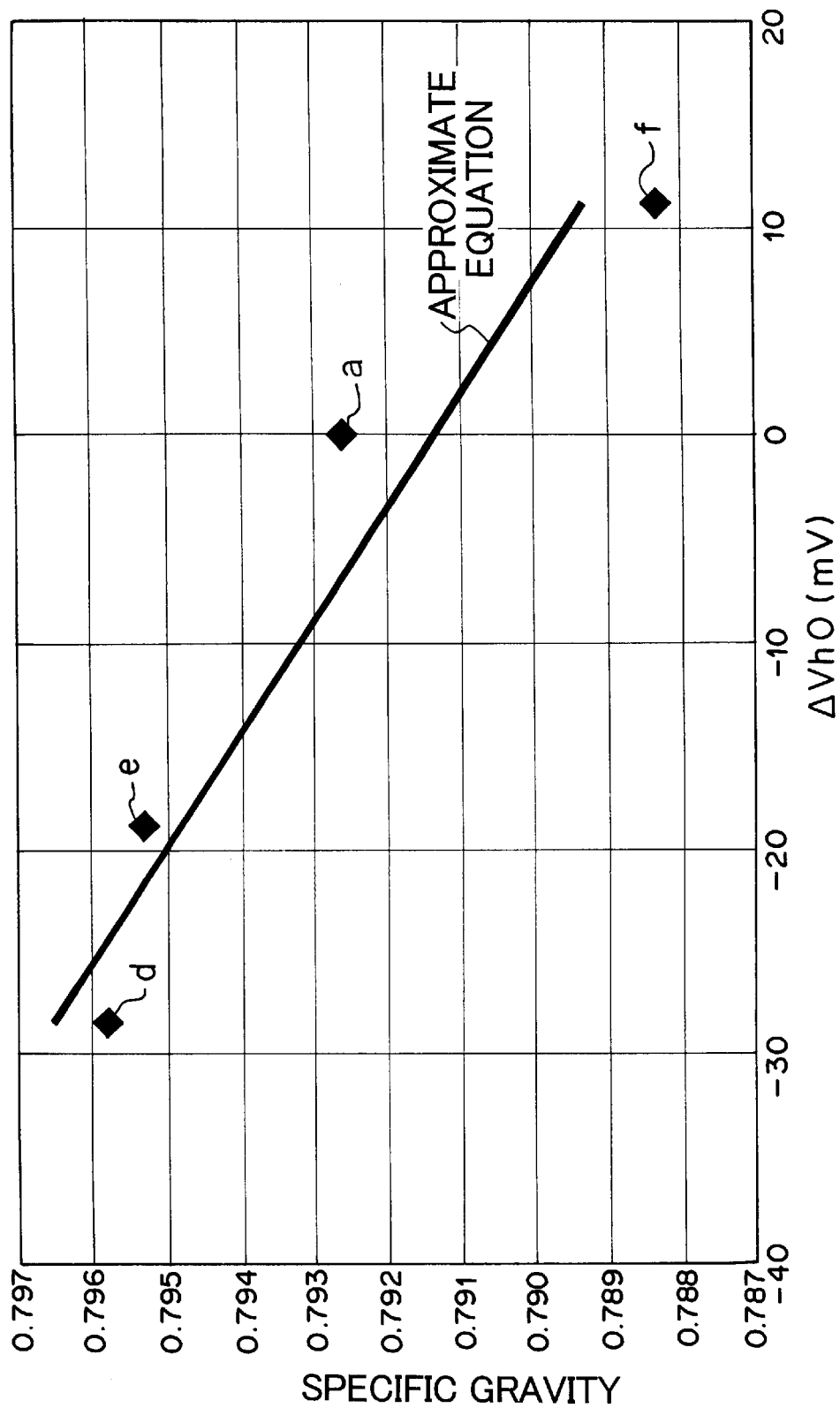
FIG. 20 is a graph showing the relationship between the reference flow rate output difference ΔVh0 and specific gravity.

It has been found that the reference flow rate data Vh0 has a strong correlation with the specific gravity of kerosene. That is, Table 1 and FIG. 20 show the relationship between $\Delta$Vh0 and the actual measurement value of the specific gravity for kerosene [d], [e], [f] (temperature of 25° C.) described with reference to FIG. 16, wherein $\Delta$Vh0 represents the difference of the reference flow rate output Vh0 for each kerosene from the reference flow rate output Vh0 of the reference kerosene [a] described with reference to FIG. 16.

TABLE 1

| KERO-SENE | ACTUALLY MEASURED VALUE OF SPECIFIC GRAVITY | Vh0(V) | $\Delta$Vh0(mV) | SPECIFIC GRAVITY ON APPROXIMATION EQUATION | ERROR (%) |
|---|---|---|---|---|---|
| a | 0.7926 | 4.8536 | 0.0 | 0.7914 | −0.16 |
| d | 0.7958 | 4.8250 | −28.6 | 0.7965 | 0.09 |
| e | 0.7953 | 4.8347 | −18.9 | 0.7948 | −0.06 |
| f | 0.7883 | 4.8649 | 11.3 | 0.7893 | 0.13 |

By approximately representing this relationship with a linear approximate equation, $$y=-(1.8138342\times10^{-4})x+0.79135816$$

wherein $\Delta$Vh0 is represented by x and the specific gravity is represented by y.

The graph of the linear approximate equation is also shown in FIG. 20. Table 1 also shows the specific gravity value corresponding to $\Delta$Vh0 for each kerosene [a], [d], [e], [f] on the linear approximate equation and the error between the specific gravity value and the actually measured value of the specific gravity. The error is in the range of ±0.2%. The linear approximate equation is stored as a specific gravity calibration curve in the memory. The specific gravity calibration curve may be commonly used to respective flowmeters because the difference thereof among the flowmeters is little. The approximate equation of the specific gravity calibration curve is not limited to the linear approximate equation as described above, and a quadratic or higher-order approximate equation may be used.

When the volumetric flow rate for kerosene under metering is achieved, in the flow rate conversion circuit, the difference $\Delta$Vh0 of the reference flow rate output value of the kerosene under metering from the reference flow rate output value Vh0 of the reference kerosene [a] at the same temperature as the kerosene under metering is determined, and the specific gravity value corresponding to $\Delta$Vh0 is achieved by using the specific gravity calibration curve as described above. The mass flow rate value is divided by the specific gravity value thus achieved to obtain a volumetric flow rate value, any one or both of the mass flow rate value and the volumetric flow rate value may be displayed on the display portion if desired.

The fluid to be metered which is subjected to the flow rate metering by the flow rate metering method and the flowmeter according to the present invention is not limited to kerosene described in the above-described embodiment, and the present invention may be applied to other composition-variable fluid, for example, petroleum products such as gasoline, naphtha, diesel or crude oil, natural gas such as LPG, concentration-variable solution such as physiological saline, slurry, sol or the like.

Next, another embodiment according to the present invention will be described with reference to the drawings.

FIGS. 22 to 26 show another embodiment of the flowmeter according to the present invention. The housing of the flowmeter contains a main body member 2 and an outer lid member 4. The main body member 2 is formed of die-casting of aluminum, zinc or the like, and the outer lid member 4 formed of die-casting of aluminum, zinc or the like is fitted to the housing main body member 2 in a specific direction (the direction of an arrow A) by screws. A fluid inlet pipe 21 is formed at one side portion of the housing main body member 2, and a fluid outlet pipe 22 is formed at the other side portion thereof. Two compartments are formed in the housing main body member 2. One compartment is a recess portion 23 for a reservoir portion at the upper side, and the other compartment is a recess portion 24 for circuit members at the lower side. The reservoir recess portion 23 is defined by the inner wall 26.

The peripheral surface of an inner lid member 6 formed of die-casting of aluminum, zinc or the like is fitted to the end face of the inner wall 26 in the direction of the arrow A so as to close the reservoir recess portion 23. When the fitting is carried out, a rubber seal (cork-added rubber seal or the like) is interposed to prevent leakage of fluid from the fitting portion, whereby a fluid reservoir portion in which the fluid is temporarily stocked and made to flow is formed between the housing main body member 2 and the inner lid member 6. An opening 21a which intercommunicates with the fluid inlet pipe 21 and opens at the reservoir recess portion 23 is formed in the housing main body member 2, and a connection opening 22a which intercommunicates with the fluid outlet pipe 22 and opens at the reservoir recess portion 23 is formed in the housing main body member 2.

A flow rate metering portion 8 to be disposed in the fluid reservoir portion is attached to the inner lid member 6. Two fluid flow paths (that is, a metering flow path and a reference flow path) as described later are formed in the flow rate metering portion 6. The entrance of the metering flow path 81 corresponding to one fluid flow path is formed on the lower surface of the flow rate metering portion 6 so as to open toward the fluid reservoir space. A joint member 8a projecting in the direction of the arrow A is fixed to the exit of the metering flow path 81, and the inner lid member 6 is fitted to the housing main body member 2 so that the joint member 8a is fitted to the connection opening 22a at the housing main member (2) side, whereby the exit of the metering flow path 81 of the flow rate metering portion 8 is made to intercommunicates with the fluid outlet pipe 22.

A thermal flow sensor 10 is inserted in a sensor mount hole 8b in the direction of the arrow A formed in the flow rate metering portion 8. The thermal flow sensor 10 has a fin plate FP serving as a heat transfer member for heat exchange and external electrode terminals, and the fin plate FP projects into the fluid flow path.

A fluid flow path defining member 9 is fixed to the inner lid member 6. The fluid flow path defining member 9 defines the flow path of fluid flowing from the opening 21a in the fluid reservoir portion by fitting the inner lid member 6 to the housing main body member 2. It leads the flow-in fluid in the downward direction from the opening 21a, and then guides the fluid through the opening formed between the lower edge of the flow path defining member 9 and the bottom surface of the fluid reservoir portion into an area where the flow rate metering portion 8 is disposed.

Figure 22:
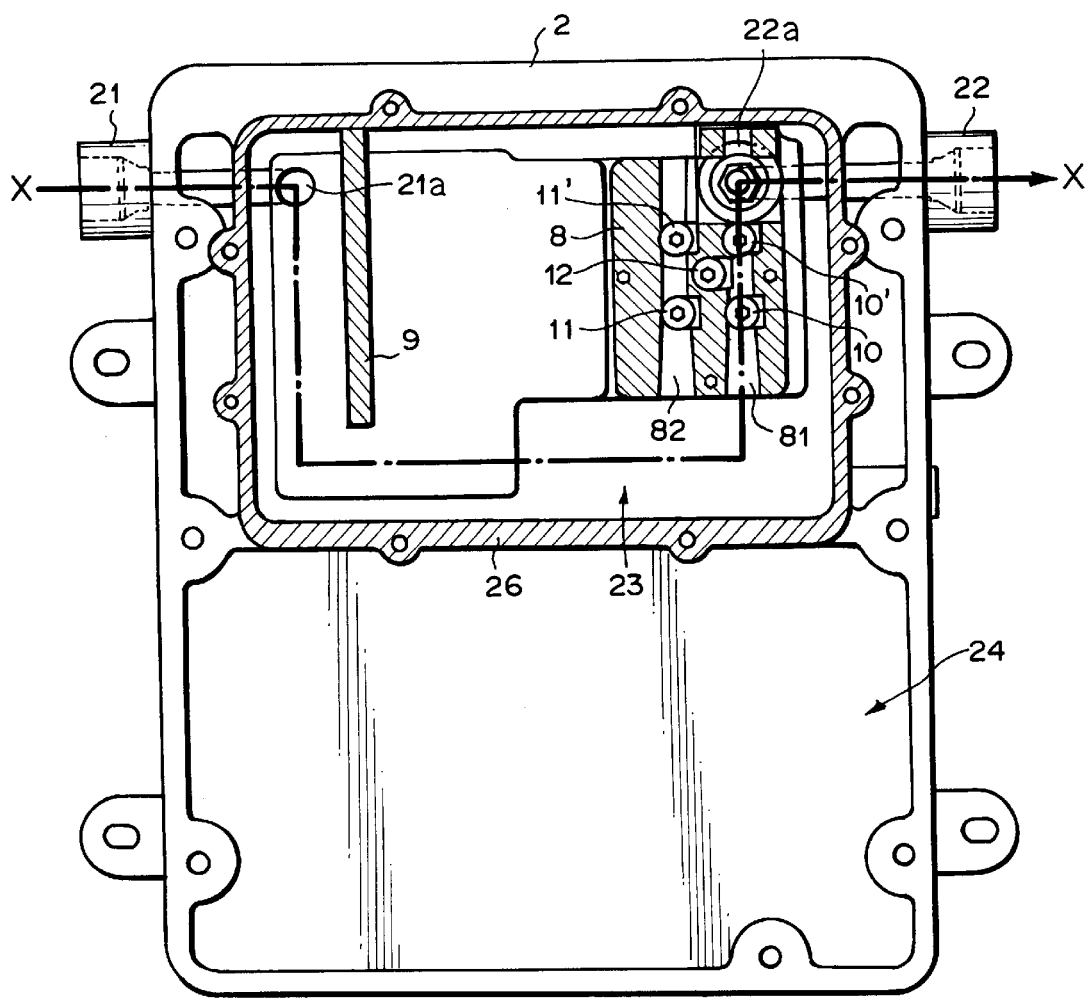
FIG. 22 is a cross-sectional view showing an embodiment of the flowmeter according to the present invention.

FIG. 22, etc. show such a state that the metering flow path 81 of the flow rate metering portion 8 extends in the up-and-down direction. The opening at the lower end of the metering flow path 81 is set as the fluid entrance, and the opening at the upper end of the metering flow path 81 is closed by the inner wall surface of the housing main body member 2 by fitting the inner lid member 6 to the housing main body 2. Just below the upper end of the metering flow path 81, a horizontal hole facing in the direction of the arrow A is formed in the flow rate metering portion 8, and this is set as the fluid exit 81a. The fluid exit 81a and the connection opening 22a at the housing main body member (2) side are disposed at the corresponding positions in the direction of the arrow A, and a flow path joint 8a is disposed through an O-ring between the fluid exit 81a and the connection opening 22a.

Two sensor insertion holes 8b intercommunicating with the metering flow path 81 are formed in the flow rate metering portion 8, and a flow sensor 10 is inserted into one sensor insertion hole 8b through an O-ring while a fluid temperature detecting sensor 10' is inserted into the other sensor insertion hole 8b through an O-ring. The flow sensor 10 has the same construction as shown in FIG. 5, and it may be constructed by joining a fin plate FP and a flow sensor FS to each other by adhesive agent AD having excellent thermal conductivity, connecting the electrode pads of the flow sensor FS to the external electrode terminals ET through bonding wires BW and sealing the result with mold resin MR. The fluid temperature detecting sensor 10' may be constructed by using a fluid temperature sensor in place of the flow sensor FS in the flow sensor 10 and equipping external electrode terminals ET in connection with the provision of the fluid temperature sensor. As the flow sensor and the fluid temperature sensor may be used ones disclosed in JP-A-11-118566.

Figure 23:
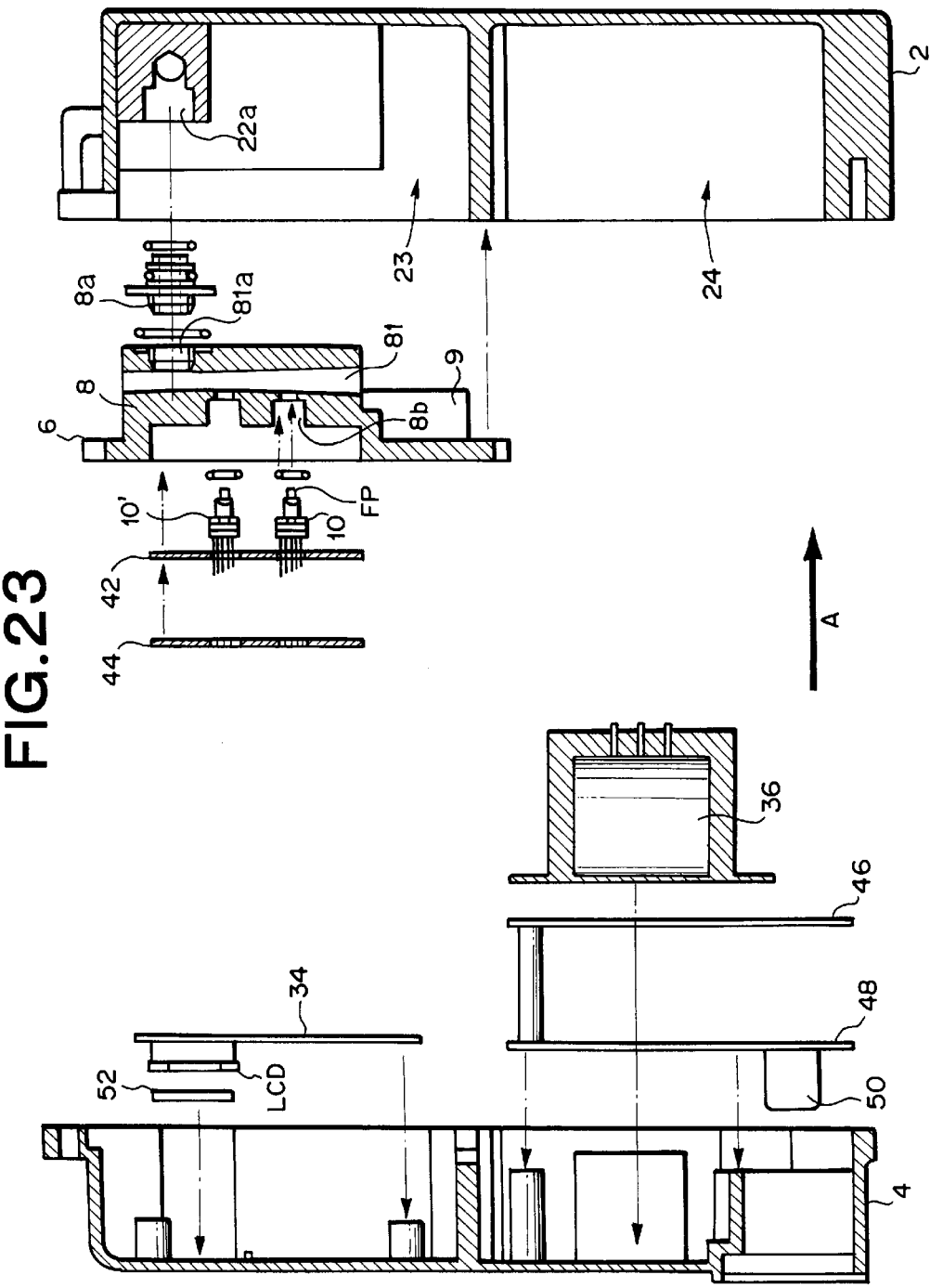
FIG. 23 is an exploded cross-sectional view showing an embodiment of the flowmeter according to the present invention.
Figure 24:
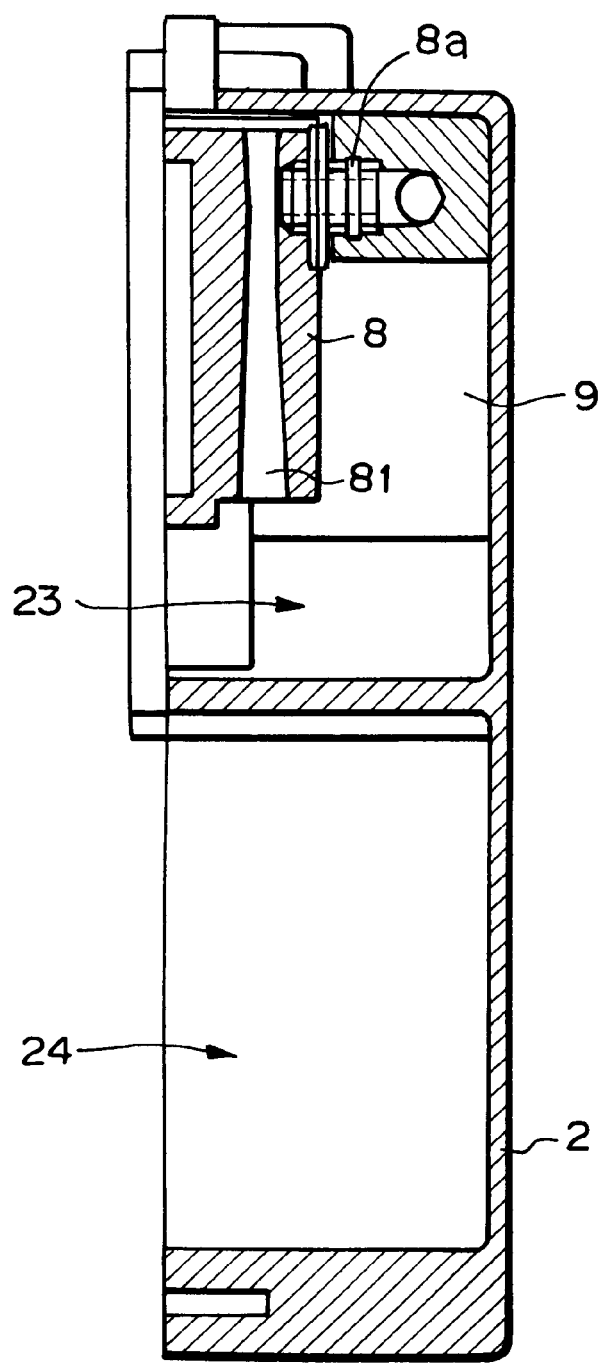
FIG. 24 is a cross-sectional view showing an embodiment of the flowmeter according to the present invention.

Furthermore, as shown in FIG. 23, a reference flow path 82 extending in the up-and-down direction is formed in parallel to the metering flow path 81 in the flow rate metering portion 8, and a flow sensor 11 and a fluid temperature detecting sensor 11' which are similar to the flow rate sensor 10 and the fluid temperature detecting sensor 10' are also disposed in the reference flow path 82. Both the upper and lower ends of the reference flow path 82 open toward the fluid reservoir portion. Furthermore, a temperature sensor 12 for mainly monitoring the temperature of the analog circuit portion is disposed in the flow rate metering portion 8.

These sensors 10, 10', 11, 11', 12 are positionally fixed by a press member 42, and an analog circuit board 44 is disposed on the press member 42. The analog circuit board 44 is electrically connected to the external electrode terminals ET of the flow sensors 10, 11 and the fluid temperature detecting sensors 10', 11'.

To the outer lid member 4 are fixed a digital circuit board 34 constituting the flow rate detecting circuit in combination with the analog circuit board, a transformer 36 constituting a power supply circuit portion and power supply boards 46, 48 serving as the input/output terminal portion of the flowmeter. A power supply cable fixing terminal 50 is secured to the power supply board 48. Particularly, the transformer 36 and the input/output terminal portion are disposed in the recess portion 24 for the circuit members. A liquid crystal display device LCD is secured to the digital circuit board 34, and an instantaneous flow rate or integrated flow rate value of the digital display can be observed from the outside through a cover plate 52

Figure 25:
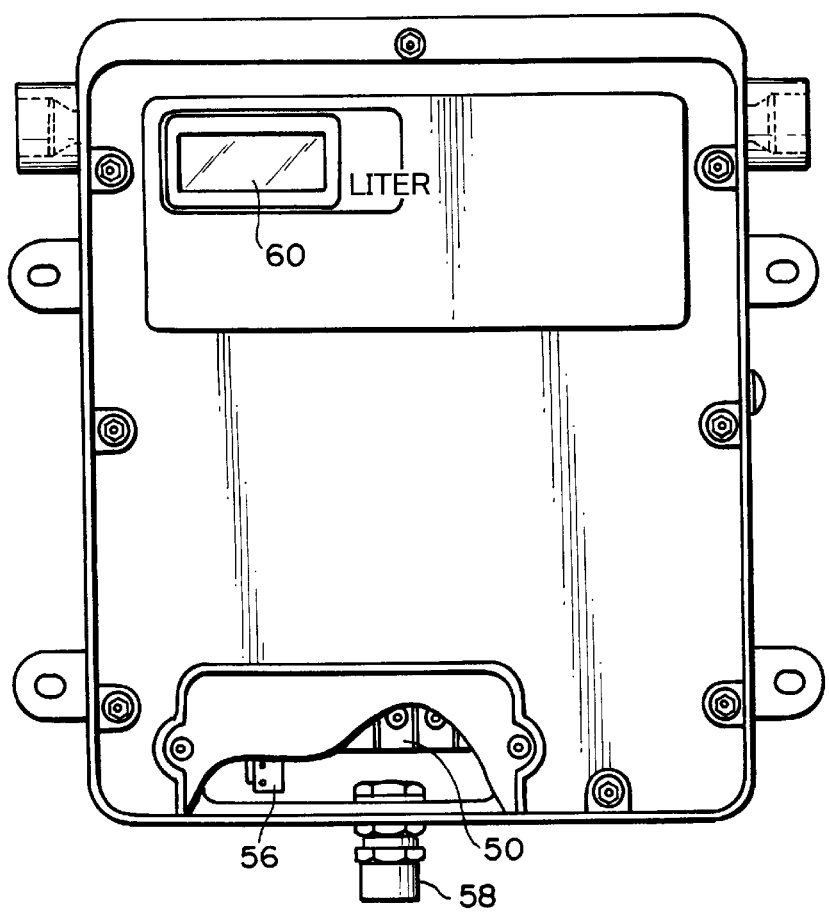
FIG. 25 is a front view showing an embodiment of the flowmeter according to the present invention.
Figure 26:
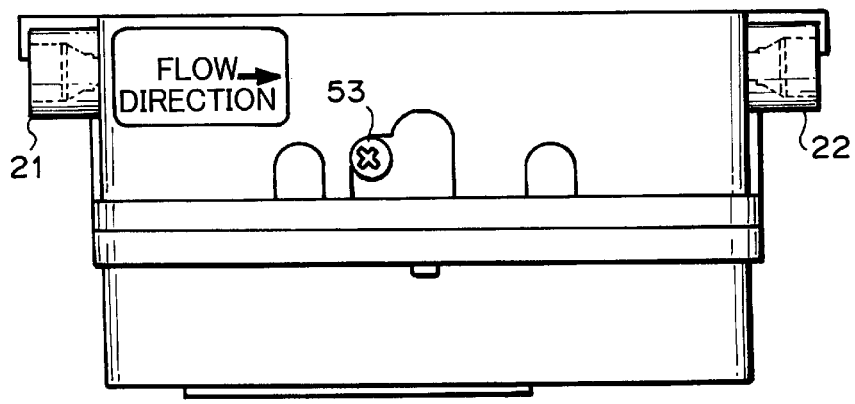
FIG. 26 is a plan view showing an embodiment of the flowmeter according to the present invention.

FIGS. 25 and 26 mainly show the outlook of the front side and the outlook of the top side, respectively. A screw 53 for venting air in the fluid reservoir portion is detachably fixed to the upper surface portion of the housing main body member 2. Undesired air remaining at the upper portion of the reservoir portion can be discharged by detaching the screw 53. A communication cable connector 56 is disposed in the housing main body member 2 together with a power supply cable fixing terminal 50. A power supply cable bush 58 is fixed to the lower surface portion of the housing main body member 2. A display portion 60 using a liquid crystal display device LCD is disposed on the front surface portion of the housing main body member 2.

In the above-described embodiment, the fluid to be supplied from the fluid supply source (not shown) through the pipe is passed from the fluid inlet pipe 21 through the opening 21a into the fluid reservoir portion. The fluid thus supplied is first fed to the bottom portion of the fluid reservoir portion along the flow path which extends in the downward direction and is defined by the flow path defining member 9, and reaches the area where the flow rate metering portion 8 is disposed. The level of the fluid thus stocked is gradually increased in the reservoir portion, and finally the flow rate metering portion 8 is perfectly immersed in the fluid. At this time, the fluid intrudes into the metering flow path 81 and the reference flow path 82. The fluid thus intruding into the metering flow path 81 is passed through the connection opening 22a and discharged from the fluid outlet pipe 22, and then supplied to fluid demand equipment (not shown). Afterwards, if there is any fluid demand at the fluid demand equipment side, the fluid is supplied from the fluid supply source to the fluid demand equipment through the inside of the reservoir portion of the flowmeter, particularly the metering flow path 81. The main flow path of the fluid in the flowmeter as described above is indicated by an arrow X in FIG. 22. A filter for removing foreign matters in the fluid may be equipped in the flow path of the flow reservoir portion, for example, at the lower portion of the flow path defining member 9.

The flow rate of the fluid in the metering flow path 81 is metered by using the metered flow rate detecting circuit containing the flow sensor 10 and the fluid temperature detecting sensor 10'. The metered flow rate detecting circuit has the same construction as shown in FIG. 7, and the flow sensor 10 is used in place of the flow sensor portion 101 of FIG. 7 while the fluid temperature detecting sensor 10' is used in place of the fluid temperature detecting sensor portion 102.

Figure 21:
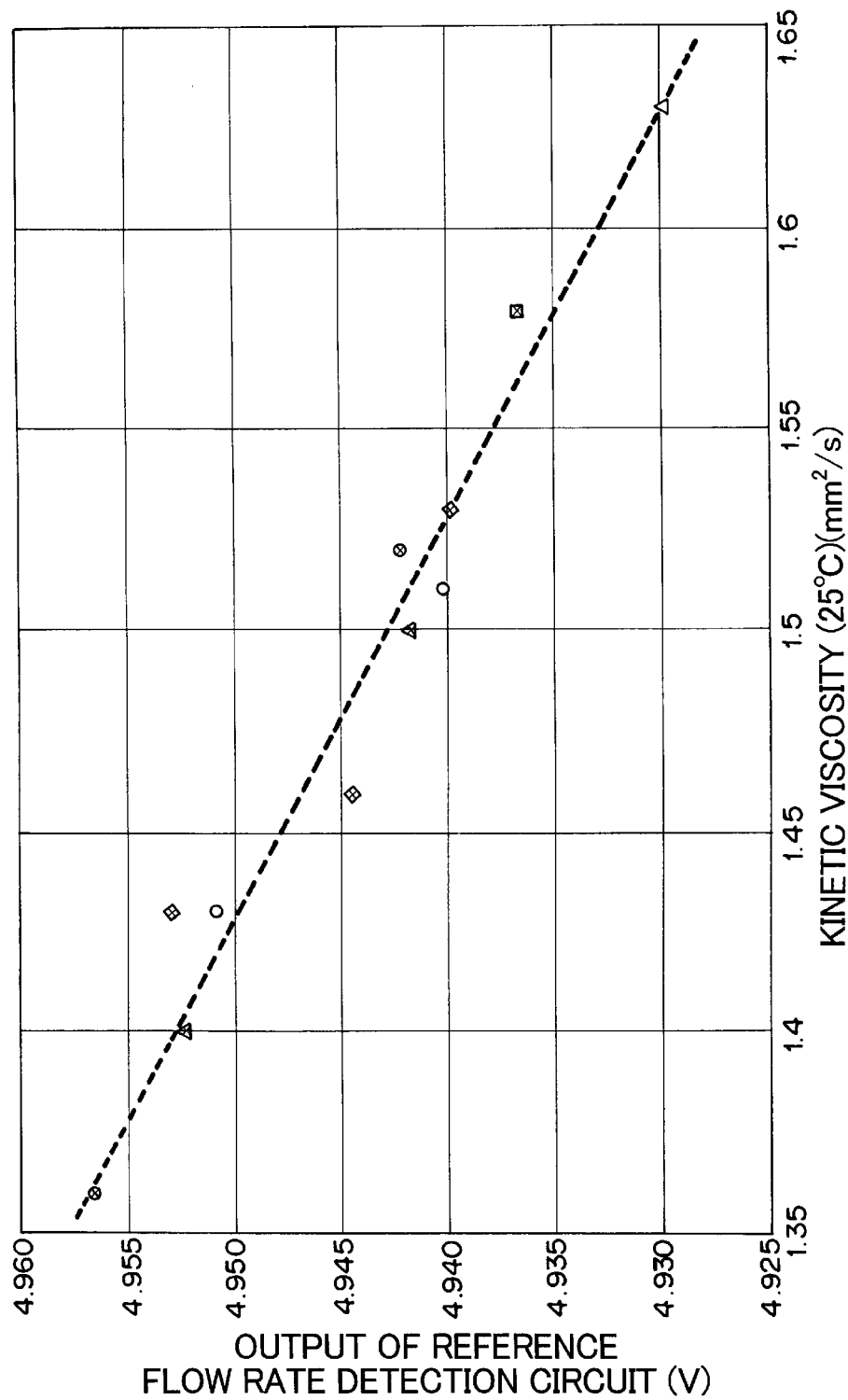
FIG. 21 is a graph showing the relationship between the kinetic viscosity of kerosene and the output voltage value of a reference flow rate detecting circuit.

The reference flow rate detecting circuit has the same construction and performs the same flow rate detection as the metered flow rate detecting circuit except that a flow sensor 11 and a fluid temperature detecting sensor 11' are used in place of the flow sensor 10 and the fluid temperature detecting sensor 10'. That is, the reference flow rate detecting circuit is similar to that shown in FIG. 7, and the flow sensor 11 is used in place of the flow sensor portion 111 of FIG. 7 and the fluid temperature detecting sensor 11' is used in place of the fluid temperature detecting sensor portion 112 of FIG. 7. There exists no fluid flow based on fluid supply, but exists only fluid flow based on natural convection in the reference flow path 82. The magnitude of the fluid flow, that is, the reference flow rate in the reference flow path 82 is varied in accordance with the kinetic viscosity of the fluid under metering as shown in FIG. 21, so that the flow rate metered by the metered flow rate detecting circuit can be corrected on the basis of the output of the reference flow rate detecting circuit as described later.

In the flow rate conversion circuit, the operation and the conversion are carried out on the basis of the metered flow rate data input from the metered flow rate detecting circuit, the reference flow rate data input from the reference flow rate detecting circuit and the analog circuit portion temperature data input from the temperature sensor circuit 12 to achieve the flow rate of the fluid under metering. When the conversion is carried out, the calibration curve (indicating the relationship between the square value of the flow rate voltage value corresponding to the electrical output of the flow rate detecting circuit and the flow rate value) prepared for the reference fluid is used.

A display portion, a communication circuit, EEPROM and a reference clock are connected to CPU containing the flow rate conversion circuit as described above. Data necessary for the operation are stored in EEPROM serving as a memory. CPU also carries out the operation of achieving an integrated flow rate value by integrating the flow rate value (instantaneous flow rate value) thus achieved. The flow rate value thus achieved is displayed on the display portion or output to the communication circuit to be used for communications with the external.

Two methods for the operation and the conversion to the flow rate which are executed in the flow rate conversion circuit will be described hereunder.

(1) First Method:

According to this method, when the flow rate conversion is carried out on the basis of the square value of the metered flow rate voltage value corresponding to the electrical output of the metered flow rate detecting circuit by using the calibration curve, the square value of the metered flow rate voltage value for the fluid under metering is first corrected, and then the conversion to the flow rate corresponding to the corrected square value is carried out by using the calibration curve prepared for the reference fluid.

Figure 27:
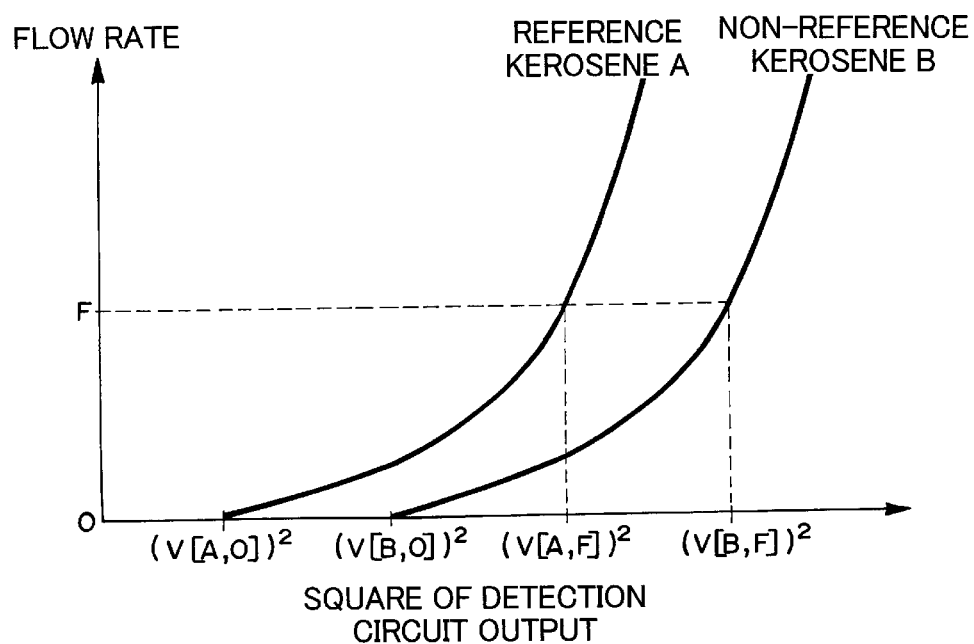
FIG. 27 is a graph showing a calibration curve of reference kerosene A and a calibration curve of kerosene B under metering.

FIG. 27 shows a calibration curve for reference kerosene A corresponding to reference fluid and a calibration curve for non-reference kerosene B (kerosene under metering) corresponding to non-reference fluid. $(V[A,F])^2$ represents a square value of the output of the detecting circuit when the flow rate of the reference kerosene A is represented by F, and $(V[B,F])^2$ represents a square value of the output of the detecting circuit when the flow rate of the non-reference kerosene B is represented by F. It is found that the calibration curve of the non-reference kerosene B substantially corresponds to a curve achieved by parallel-shifting the calibration curve of the reference kerosene A. That is, the following is substantially satisfied:

$$(V[B,F])^2 - (V[A,F])^2 = (V[B,0])^2 - (V[A,0])^2 = \Delta$$

Accordingly, when the conversion is carried out by using the calibration curve of the reference kerosene A on the basis of the value of $(V[B,F])^2$ achieved for the kerosene B under metering (this may be the reference kerosene A), the conversion may be carried out after the value of $(V[B,F])^2$ is corrected by only the value corresponding to the movement amount $\Delta$ of the parallel movement. The output of the reference flow rate detecting circuit is equal to $(V[B,0])^2$, and the output V[A,0] of the reference flow rate detecting circuit for the reference kerosene A may be measured and stored in advance.

Therefore, in the flow rate conversion circuit, the value of $(V[B,F])^2 - a\{(V[B,0])^2 - (V[A,0])^2\}$ is calculated on the basis of the metered flow rate value V[B,F] and the reference flow rate value V[B,0] and further the value of the output V[A,0] of the reference flow rate detecting circuit for the reference kerosene A stored in advance. $\Delta' = a\{(V[B,0])^2 - (V[A,0])^2\}$ is a correction term. Here, "a" represents a correction coefficient, and it is used to correct a slight difference in heater characteristic between the flow sensor 10 of the metered flow rate detecting circuit and the flow sensor 11 of the reference flow rate detecting circuit and the differences in other characteristics therebetween. The correction coefficient may be achieved by actually metering some kinds of kerosene, and stored in advance.

Therefore, in the flow rate conversion circuit, the flow rate value corresponding to the value of $(V[B,F])^2 - a\{(V[B,0])^2 - (V[A,0])^2\}$ is determined on the basis of the calibration curve for the reference kerosene A, and output.

FIG. 28 is a graph showing the measurement error in the flow rate metering carried out according to the method as described above. The correction coefficient a was set to 0.3 in an actual measurement using two kinds of kerosene. As is apparent from FIG. 28, as compared with the case where the measurement value is achieved without executing the method of the present invention (before correction: correction term Δ'=0), the measurement error can be more sufficiently reduced in the case where the measurement value is achieved by executing the method of the present invention (after correction).

(2) Second Method:

According to this method, when the flow rate conversion is carried out by using the calibration curve on the basis of the square value of the metered flow rate voltage value corresponding to the electrical output of the metered flow rate detecting circuit, the flow rate value is first achieved by the conversion using the calibration curve, and the flow rate value thus achieved is multiplied by the correction parameter corresponding to the electrical output of the reference flow rate detecting circuit to be converted to the corrected flow rate.

A correction parameter b is dependent on the kinetic viscosity v of the fluid under metering, and it can be determined as b(V[B, 0]), that is, as the value corresponding to the output V[B,0] of the reference flow rate detecting circuit in connection with the kinetic viscosity v, by actual measurements using some kinds of kerosene as shown in FIG. 1, and stored in advance.

Accordingly, in the flow rate conversion circuit, the flow rate F(B) achieved by using the calibration curve for the reference kerosene A is multiplied by the correction parameter b(V[B,0]) corresponding to the output V[B,0] of the reference flow rate detecting circuit to calculate and output the corrected flow rate value F=b(V[B,0])×F(B). When the value of the correction parameter b(V[B,0]) which strictly corresponds to V[B,0] is not stored in the memory, extrapolation may be carried out on the basis of plural relationships between V[B,0] and b(V[B,0]) for the correction parameter stored to determine the value of the value of the required correction parameter b.

In the descriptions on the first method and the second method, no consideration is given to a signal representing the temperature of the analog circuit portion which is input from the temperature sensor portion to the flow rate conversion circuit. In order to further enhance the metering precision, it is preferable to give consideration to the temperature for the correction. That is, the correction coefficient a and the output V[A,0] of the reference flow rate detecting circuit in the first method and the correction parameter b(V[B,0]) in the second method are stored in advance as temperature-basis data, and the values corresponding to temperatures detected by the temperature sensor circuit are selected from the temperature-basis data and used. If the values which strictly correspond to the detected temperatures are not stored in the memory, extrapolation may be carried out on the basis of the relationship in plural temperatures stored to thereby determine the value of a required temperature.

In the case where consideration is given to the temperature, only a calibration curve for reference kerosene at a standard temperature (for example, 25° C.) may be used, or calibration curves for reference kerosene which are different in accordance with the temperature may be prepared and the calibration curve corresponding to the detected temperature may be used. Of course, the specific values such as the correction coefficient, the correction parameter, etc. may be different in accordance with the calibration curve being used.

The fluid under metering which is subjected to flow rate metering according to the flow rate metering method and the flowmeter of the present invention is not limited to kerosene described in the above embodiments, and the present invention may be applied to other composition-variable fluid, for example, petroleum products such as gasoline, naphtha, diesel or crude oil, natural gas such as LPG, concentration-variable solution such as physiological saline, slurry, sol or the like.

INDUSTRIAL APPLICABILITY

As described above, according to the flow rate metering method and the flowmeter of the present invention, flow rate metering having little measurement error can be performed even when the thermal property of fluid is varied due to variation of the composition of fluid or the like.

What is claimed is:

1. A method of metering a flow rate of fluid by making the fluid under metering flow into a metering flow path, achieving the electrical output corresponding to a metered flow rate of the fluid under metering in the metering flow path by an electrical circuit constructed so as to contain a thermal type flow sensor disposed in the metering flow path and converting the electrical output corresponding to the metered flow rate to a flow-rate value by using pre-created calibration curves, characterized in that:

the fluid under metering is filled in a reference flow path so as to freely flow, and the electrical output corresponding to a reference flow rate of the fluid under metering in the reference flow path is achieved by an electrical circuit constructed so as to contain a thermal type reference flow sensor disposed in the reference flow path;

the calibration curves contain reference flow-rate calibration curves and metered flow rate calibration curves that are achieved with reference to plural temperatures for reference fluid; and on the basis of the electrical output corresponding to the reference flow rate achieved for the fluid under metering, a deviation amount of the temperature on the reference flow-rate calibration curve corresponding to the electrical output corresponding to the reference flow rate from a reference temperature is determined, a temperature correction amount to the metered flow rate calibration curve of the reference temperature is achieved on the basis of the deviation amount, and the conversion to the flow rate value of the fluid under metering is performed on the basis of the electrical output corresponding to the metered flow rate of the fluid under metering by using the metered flow rate calibration curve for the reference temperature and taking the temperature correction amount into consideration.

2. The flow rate metering method as claimed in claim 1, wherein, with respect to fluid, different from the reference fluid, a second temperature on a reference flow rate calibration curve which corresponds to the electrical output corresponding to a reference flow rate achieved at a first temperature is determined, a third temperature on a metered flow rate calibration curve at a certain flow rate corresponding to the electrical output corresponding to a metered flow rate achieved at the certain flow rate at the first temperature is determined, the ratio of the difference between the first temperature and the third temperature to the difference between the first temperature and the second temperature is achieved, and then the deviation amount is multiplied by the ratio to achieve the temperature correction amount.

3. The flow rate metering method as claimed in claim 1, wherein the calibration curves contain a specific gravity calibration curve indicating the relationship between the electrical output corresponding to the reference flow rate and the specific gravity, and conversion from the flow rate value of the fluid under metering to a volumetric flow rate value of the fluid under metering is performed by using the specific gravity calibration curve.

4. A flowmeter for metering a flow rate of fluid passing through a housing by feeding the fluid into the housing, stocking the fluid in the housing and feeding out the fluid to the outside of the housing, characterized by comprising:

a metering flow path disposed in said housing for passing the fluid in connection with the feed-in or feed-out of the fluid into/from said housing; a reference flow path disposed in said housing, the fluid stocked being filled in said reference flow path so as to freely flow; a thermal type metering flow sensor disposed in said metering flow path; and a thermal type reference flow sensor disposed in said reference flow path, wherein the electrical output corresponding to a metered flow rate achieved by using said thermal type metering flow sensor is corrected on the basis of the electrical output corresponding to a reference flow rate achieved by using said thermal type reference flow sensor to thereby achieve a flow rate value.

5. The flowmeter as claimed in claim 4, further comprising a metered flow rate detecting circuit constructed so as to contain said thermal type metering flow sensor, a reference flow rate detecting circuit constructed so as to contain said thermal type reference flow sensor, and a flow rate conversion circuit for performing conversion to the flow rate value corresponding to the electrical output corresponding to the metered flow rate achieved in said metered flow rate detecting circuit by using a reference flow rate calibration curve and a metered flow rate calibration curve which are achieved with respect to plural temperatures for a reference fluid, wherein said flow rate conversion circuit determines, on the basis of the electrical output corresponding to the reference flow rate achieved for the fluid under metering in said reference flow rate detecting circuit, a deviation amount of the temperature on the reference flow rate calibration curve corresponding to the electrical output corresponding to the reference flow rate from a reference temperature, achieves a temperature correction amount to the metered flow rate calibration curve of the reference temperature on the basis of the deviation amount, and converts to the flow rate value of the fluid under metering on the basis of the electrical output corresponding to the metered flow rate of the fluid under metering by using the metered flow rate calibration curve for the reference temperature and taking the temperature correction amount into consideration.

6. The flowmeter as claimed in claim 5, wherein, with respect to fluid different from the reference fluid, said flow rate conversion circuit determines a second temperature on a reference flow rate calibration curve which corresponds to the electrical output corresponding to a reference flow rate achieved at a first temperature, determines a third temperature on the metered flow rate calibration curve at a certain flow rate corresponding to the electrical output corresponding to the metered flow rate achieved at the certain flow rate at the first temperature, and achieves the ratio of the difference between the first temperature and the third temperature to the difference between the first temperature and the second temperature, and said flow rate conversion circuit multiplies the deviation amount by the ratio to thereby achieve the temperature correction amount.

7. The flowmeter as claimed in claim 5, wherein said flow rate conversion circuit converts the flow rate value of the fluid under metering to a volumetric flow rate value of the fluid under metering by using a specific gravity calibration curve indicating the relationship between the electrical output corresponding to the reference flow rate and the specific gravity.

8. The flowmeter as claimed in claim 5, wherein said thermal type metering flow sensor has a first fin plate projecting into said metering flow path for thermal interaction with the fluid, and said thermal type reference flow sensor has a second fin plate projecting into said reference flow path for thermal interaction with the fluid.

9. A method of metering a flow rate of fluid by making the fluid under metering flow into a metering flow path, achieving the electrical output corresponding to a metered flow rate of the fluid under metering in said metering flow path by an electrical circuit constructed so as to contain a thermal type flow sensor disposed in said metering flow path by utilizing the fact that a heat absorption amount from the thermal type flow sensor to the fluid under metering corresponds to the metered flow rate of the fluid under metering in the metering flow path, and performing conversion to the flow rate value corresponding to the electrical output corresponding to the metered flow rate by using pre-created calibration curves, characterized in that:

the calibration curve is created for a reference fluid;

the fluid under metering is filled in a reference flow path so as to freely flow therethrough, and the electrical output corresponding to a reference flow rate of the fluid under metering in said reference flow path is achieved by an electrical circuit constructed so as to contain a thermal type reference flow sensor disposed in said reference flow path by utilizing the fact that a heat absorption amount from said thermal type reference flow sensor to the fluid under metering corresponds to the reference flow rate of the fluid under metering in said reference flow path; and the output-corresponding value corresponding to the electrical output corresponding to the metered flow rate or the flow rate value achieved by the conversion using the calibration curve is corrected by using the electrical output corresponding to the reference flow rate, thereby correcting the error of the flow rate value due to the difference in thermal property of the fluid under metering from the reference fluid.

10. The flow rate metering method as claimed in claim 9, wherein the correction of the output-corresponding value corresponding to the electrical output corresponding to the metered flow rate is performed by subtracting, from the square value of the electrical output corresponding to the metered flow rate of the fluid under metering, a correction term of a result achieved by subtracting the square value of the electrical output corresponding to the reference flow rate achieved in advance for the reference fluid from the square value of the electrical output corresponding to the reference flow rate of the fluid under metering.

11. The flow rate metering method as claimed in claim 10, wherein the temperature is measured, and the amount corresponding to a value at the measured temperature is used as the electrical output corresponding to the reference flow rate achieved in advance for the reference fluid when the correction term is achieved.

12. The flow rate metering method as claimed in claim 10, wherein the correction term contains a correction coefficient for correcting the difference in characteristic between said thermal type flow sensor and said thermal type reference flow sensor.

13. The flow rate metering method as claimed in claim 9, wherein the correction of the flow rate value achieved by the conversion using the calibration curve is performed by multiplying the flow rate value achieved through the conversion by a correction parameter corresponding to the electrical output corresponding to the reference flow rate.

14. The flow rate metering method as claimed in claim 13, wherein the temperature is measured, and the value at the measured temperature is used as the correction parameter.

15. A flowmeter for metering a flow rate of fluid passing through a housing by feeding the fluid into the housing, stocking the fluid in the housing and feeding out the fluid to the outside of the housing, characterized by comprising:

a metering flow path disposed in said housing for passing the fluid in connection with the feed-in or feed-out of the fluid into/from said housing; a reference flow path disposed in said housing, the fluid stocked being filled in said reference flow path so as to freely flow; a first thermal type flow sensor disposed in said metering flow path; a second thermal type flow sensor disposed in said reference flow path; a first flow rate detection circuit constructed so as to contain said first thermal type flow sensor; and a second flow rate detection circuit constructed so as to contain said second thermal type flow sensor, wherein conversion from both of the first output-corresponding value corresponding to a first output value achieved in said first flow rate detection circuit on the basis of the thermal interaction between the fluid in said metering flow path and said first thermal type flow sensor and the second output-corresponding value corresponding to a second output value achieved in said second flow rate detection circuit on the basis of the thermal interaction between the fluid in said reference flow path and said second thermal type flow sensor to the flow rate value is performed on the basis of a correction output-corresponding value achieved by correcting the first output-corresponding value on the basis of the second output-corresponding value by using a calibration curve for reference fluid.

16. A flowmeter for metering a flow rate of fluid passing through a housing by feeding the fluid into the housing, stocking the fluid in the housing and feeding out the fluid to the outside of the housing, characterized by comprising:

a metering flow path disposed in said housing for passing the fluid in connection with the feed-in or feed-out of the fluid into/from said housing; a reference flow path disposed in said housing, the fluid stocked being filled in said reference flow path so as to freely flow; a first thermal type flow sensor disposed in said metering flow path; a second thermal type flow sensor disposed in said reference flow path; a first flow rate detection circuit constructed so as to contain said first thermal type flow sensor; and a second flow rate detection circuit constructed so as to contain said second thermal type flow sensor, wherein conversion to a flow rate value is performed by using a calibration curve for reference fluid on the basis of a first output-corresponding value corresponding to a first output value achieved in said first flow rate detection circuit on the basis of the thermal interaction between the fluid in said metering flow path and said first thermal type flow sensor, and a corrected flow rate value is achieved by multiplying the flow rate value by a correction parameter corresponding to a second output value achieved in said second flow rate detection circuit on the basis of the thermal interaction between the fluid in said reference flow path and said second thermal type flow sensor.

17. The thermal type flowmeter as claimed in claim 15, wherein said metering flow path and said reference flow path are formed in a flow rate metering portion disposed in said housing, an entrance of said metering flow path is formed to open toward a fluid reservoir portion formed in said housing so as to intercommunicate with a fluid inlet pipe formed in said housing, an exit of said metering flow path intercommunicates with a fluid outlet pipe formed in said housing, and an entrance and exit of said reference flow path are formed to open toward said fluid reservoir portion.

18. The thermal flowmeter as claimed in claim 15, wherein said first thermal type sensor has a first fin plate projecting into said metering flow path for the thermal interaction with the fluid, and said second thermal type flow sensor has a second fin plate projecting into said reference flow path for the thermal interaction with the fluid.

19. The thermal type flowmeter as claimed in claim 16, wherein said metering flow path and said reference flow path are formed in a flow rate metering portion disposed in said housing, an entrance of said metering flow path is formed to open toward a fluid reservoir portion formed in said housing so as to intercommunicate with a fluid inlet pipe formed in said housing, an exit of said metering flow path intercommunicates with a fluid outlet pipe formed in said housing, and an entrance and exit of said reference flow path are formed to open toward said fluid reservoir portion.

20. The thermal flowmeter as claimed in claim 16, wherein said first thermal type sensor has a first fin plate projecting into said metering flow path for the thermal interaction with the fluid, and said second thermal type flow sensor has a second fin plate projecting into said reference flow path for the thermal interaction with the fluid.

* * * * *